US012496740B2

(12) United States Patent
Kerwin et al.

(10) Patent No.: US 12,496,740 B2
(45) **Date of Patent: *Dec. 16, 2025**

(54) WEIGHT MATERIAL CUTTING, DISPENSING AND APPLYING SYSTEMS

(71) Applicant: INTERNATIONAL WHEEL & TIRE COMPANY, Farmington Hills, MI (US)

(72) Inventors: Kevin R. Kerwin, Lake Orion, MI (US); Peter L. Gross, Indianapolis, IN (US); Todd A. Campbell, La Salle, MI (US); Netresh U. Rege, Royal Oak, MI (US); Patrick W. Zoller, Royal Oak, MI (US); Jeffrey N. Skomski, Macomb, MI (US); Marc A. Walters, Lake Orion, MI (US); Kristopher J. Walters, Jr., Royal Oak, MI (US); Erik L. McClain, Livonia, MI (US)

(73) Assignee: International Wheel & Tire Company, Farmington Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,851

(22) Filed: Apr. 24, 2023

(65) Prior Publication Data

US 2023/0256639 A1 Aug. 17, 2023

Related U.S. Application Data

(60) Continuation of application No. 16/507,571, filed on Jul. 10, 2019, now Pat. No. 11,660,773, which is a (Continued)

(51) Int. Cl.
*B26D 5/20* (2006.01)
*B26D 1/18* (2006.01)
(Continued)

(52) U.S. Cl.
CPC ............... *B26D 5/20* (2013.01); *B26D 1/185* (2013.01); *B26D 1/385* (2013.01); *B26D 3/08* (2013.01);
(Continued)

(58) Field of Classification Search
CPC ... B26D 5/20; B26D 7/08; B26D 3/08; B26D 5/007; B26D 1/385; B26D 1/185;
(Continued)

(56) References Cited

U.S. PATENT DOCUMENTS 3,688,622 A 9/1972 Wahnschaff
4,297,930 A 11/1981 Putzke
(Continued)

FOREIGN PATENT DOCUMENTS

FR 2846643 A1 * 5/2004 ............. B65H 18/08
FR 2883984 A1 * 10/2006 ......... B29C 63/0073
(Continued)

*Primary Examiner* — Ghassem Alie
(74) *Attorney, Agent, or Firm* — Brooks Kushman, P.C.

(57) ABSTRACT

A feed and cutting unit for selectively cutting and dispensing individual weight material segments from a common strip of backing material is disclosed. The feed and cutting unit comprises a feed assembly, a sensor and a cutter member. The feed assembly includes a drive roller and a follower roller that frictionally engages first and second surfaces of a strip of weight material to selectively move the strip of weight material to a cutter member. The sensor is connected to a controller and measures an amount of segmented weight material on the backing material as the strip of weight material moves past the sensor. The cutter member is actuated to separate weight material segments from the backing material by cutting at least a portion of the backing material in a gap disposed between adjacent segments. Weight apply devices that receive the segments for application to an imbalanced member, are also disclosed.

13 Claims, 24 Drawing Sheets

Related U.S. Application Data division of application No. 15/307,580, filed as application No. PCT/US2015/027966 on Apr. 28, 2015, now abandoned.

(60) Provisional application No. 61/985,087, filed on Apr. 28, 2014.

(51) Int. Cl.

| | |
|---|---|
| ***B26D 1/38*** | (2006.01) |
| ***B26D 3/08*** | (2006.01) |
| ***B26D 5/00*** | (2006.01) |
| ***B26D 7/08*** | (2006.01) |
| ***B65H 16/00*** | (2006.01) |
| ***B65H 21/00*** | (2006.01) |
| ***B65H 35/00*** | (2006.01) |

(52) U.S. Cl.

CPC ............... *B26D 5/007* (2013.01); *B26D 7/08* (2013.01); *B65H 16/005* (2013.01); *B65H 21/00* (2013.01); *B65H 35/0093* (2013.01); *B65H 2301/51512* (2013.01); *B65H 2301/51532* (2013.01); *B65H 2301/515323* (2013.01); *B65H 2511/11* (2013.01); *B65H 2511/14* (2013.01); *B65H 2553/40* (2013.01); *B65H 2701/1714* (2013.01)

(58) Field of Classification Search

CPC .............. B65H 16/005; B65H 35/0093; B65H 2301/51512; B65H 2701/1714; B65H 2511/11; B65H 2301/51532; B65H 2301/515323; B65H 2553/40; B65H 2220/01; B65H 2511/14; B26H 21/00; B26H 2511/14

USPC ..................................... 83/76, 102, 111, 365

See application file for complete search history.

(56) References Cited

U.S. PATENT DOCUMENTS

| | | | | |
|---|---|---|---|---|
| 4,426,898 | A | 1/1984 | Friberg | |
| 4,573,271 | A * | 3/1986 | Hamilton ................ | B23P 19/04 901/45 |
| 6,290,164 | B1 | 9/2001 | O'Connor et al. | |
| 6,616,089 | B2 * | 9/2003 | Gross ...................... | G01M 1/02 242/562 |
| 7,437,257 | B2 * | 10/2008 | Yasui ..................... | G01C 17/38 702/104 |
| 7,478,659 | B2 * | 1/2009 | Jeon ...................... | G01M 1/326 156/581 |
| 8,943,940 | B2 * | 2/2015 | Hedtke, Jr. ........... | G01M 1/326 83/76.6 |
| 2003/0085315 | A1 | 5/2003 | Rodriguez et al. | |
| 2004/0094263 | A1 | 5/2004 | Middelstadt et al. | |
| 2008/0115641 | A1 | 5/2008 | Freyburger et al. | |
| 2010/0154611 | A1 * | 6/2010 | Lammlein, Jr. ........ | B26D 3/003 83/78 |
| 2011/0283790 | A1 | 11/2011 | Hedtke, Jr. et al. | |
| 2014/0000432 | A1 * | 1/2014 | Hedtke, Jr. ............ | B26D 1/085 83/33 |
| 2014/0210896 | A1 | 7/2014 | Bar-tal et al. | |
| 2017/0050330 | A1 | 2/2017 | Kerwin et al. | |

FOREIGN PATENT DOCUMENTS

| | | | |
|---|---|---|---|
| JP | 2007084125 | A * | 4/2007 |
| WO | 2015168106 | A1 | 11/2015 |

* cited by examiner

FIG. 6
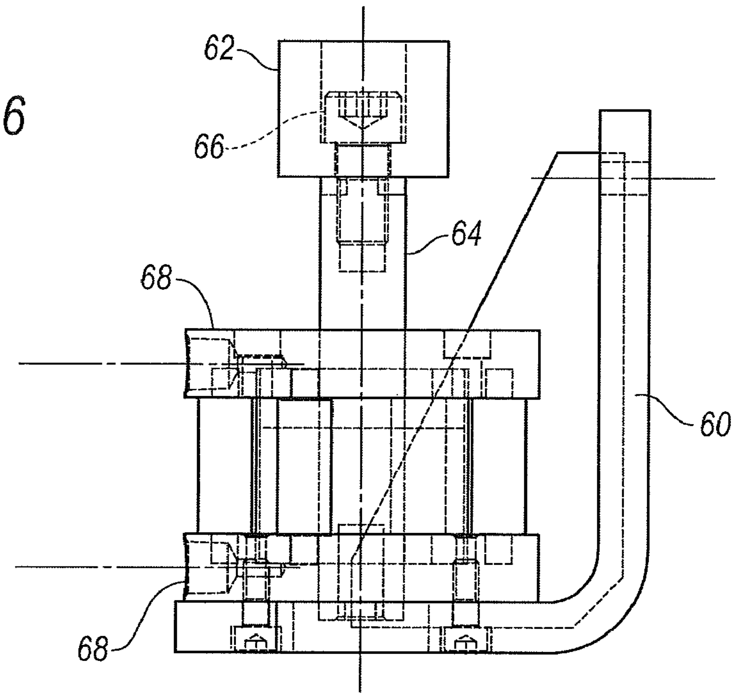
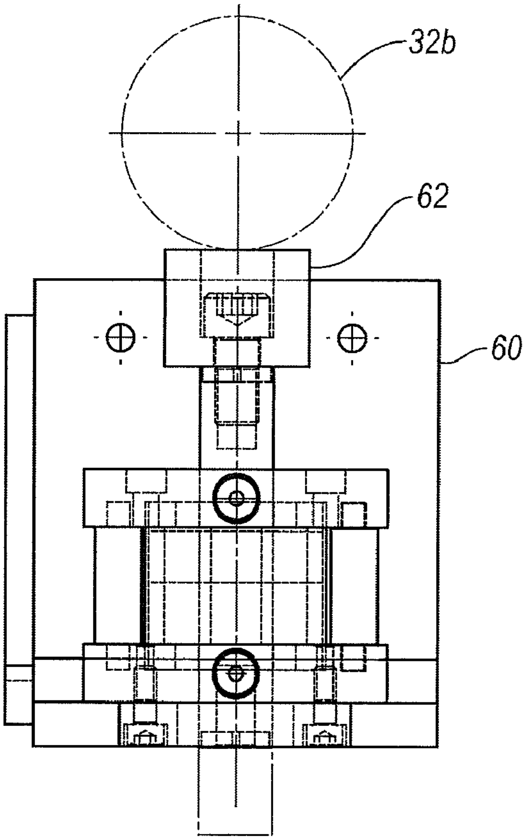
FIG. 7

WEIGHT MATERIAL CUTTING, DISPENSING AND APPLYING SYSTEMS

CROSS-REFERENCE TO RELATED APPLICATIONS

This application is a Continuation of U.S. application Ser. No. 16/507,571 filed Jul. 10, 2019, which is a Division of U.S. application Ser. No. 15/307,580 filed Oct. 28, 2016, now abandoned, which is the U.S. National Phase of PCT Application No. PCT/US2015/027966 filed on Apr. 28, 2015, which claims benefit of U.S. Provisional Application Ser. No. 61/985,087 filed on Apr. 28, 2014, the disclosures of which are incorporated in their entirety by reference herein.

TECHNICAL FIELD

The disclosure relates to weight material cutting and dispensing systems and more particularly to weight material cutting dispensing systems that are configured to apply weight material.

BACKGROUND

Rotating elements are used in many different applications, including, for example, automotive applications. Any weight imbalance in rotating elements may result in undesirable vibration. In the automotive industry, for example, such vibration can undesirably impact wear on vehicle components or create a poor vehicle driving experience for riders in a vehicle. To avoid these issues, it is known to subject rotating elements to a balancing operation. More specifically, using vehicle wheels as an example, a balancing machine may be utilized during the manufacturing process to spin a wheel assembly to determine which, if any, points of the wheel may require more weight to more evenly distribute weight of the assembly, as well as how much weight to apply to each of the identified points.

Various types of weight material have been used to address balance issues. Continuing with the wheel example, it is known to use “pound on” weights that are configured to be clipped and hammered onto a wheel rim. These types of weight elements are provided in different, predetermined weight increments. As a result, multiple part numbers must be inventoried and managed. Moreover, as the various weights may not look appreciably different in size, there are also issues with inadvertent mixing of the weights, as well as inadvertent use of the wrong size weight. Finally, the hammering action required to pound on the weight can inadvertently lead to damage to the element being balanced, or even chipping off a portion of the weight element, thereby reducing the effectiveness of the weight element.

Another type of weight material that has been used includes individual weight segments that each have their own integrated adhesive backing. The individual weight material segments each have a predetermined weight increment and multiple segments of different predetermined weights may be selected and applied to the part requiring balancing. Again, however, multiple part numbers must be inventoried, stored and managed for correctly using the weights.

It is also known to provide individual weight segments arranged on a common strip of adhesive backing cut to a predefined length. The strip of segmented weights is disposed on a length of adhesive material, with one side attached to the bottom of the weights and the other side being affixed to a protective release liner. Each of the weights is placed in the same orientation on the adhesive strip, separated by a small gap from one another. However, for some applications, two weights may be needed; for others, 5 weights. Accordingly, this practice required assembly shops to have on hand pre-sorted boxes of the different segment lengths of weights, taking up valuable floor space. Moreover, as the sorting of the segments and placing the different sized lengths is performed manually, human error results in the wrong sized segments being collected together. In addition, applying the correct length segment also depended on the person applying the weights to select from the correct bin.

To reduce inventory issues, as well as minimize human error in applying the correct weight, it has been proposed to provide a non-segmented strip of weight material that is cut to selectively length by a cutter. However, as lead material is toxic, and iron, if exposed, will rust, a special high density weight material that can be exposed and cut must be used. Due to nature of the material, however, it has been found to discolor over time, leading to consumers being concerned over the appearance of the weight material. Further, to cut through the material, an expensive cutter must be employed that has a cutting blade that is robust enough to cut completely through the material. Moreover, a cutting unit must be equipped with several cutting blades, as the cutting blades may need to be changed frequently due to dulling of blade.

What is needed is a system for selectively cutting and dispensing segmented weights that may minimize inventory concerns, as well as a system for reducing blade wear.

SUMMARY

A feed and cutting unit for selectively cutting and dispensing individual weight material segments from a common strip of backing material is disclosed. The individual weight material segments are arranged in series on a common strip of backing material with adhesive disposed on the individual weight material segments to form a strip of weight material. A gap is positioned between each of the individual weight material segments.

The feed and cutting unit comprises a feed assembly, at least one sensor, and a cutter member. The feed assembly includes a drive roller operatively connected to a motor and a follower roller that cooperates with the drive roller to frictionally engage first and second surfaces of a strip of weight material to selectively move the strip of weight material to the cutter member.

The at least one sensor is operatively connected to a controller. The sensor measures a predetermined amount of segmented weight material on the strip of weight material as the feed assembly moves the strip of weight material past the sensor. In one exemplary arrangement, the at least one sensor is an optical sensor.

The cutter member is operatively connected to the controller. The controller actuates the cutter member to separate the predetermined amount of segmented weight material from the strip of weight material by cutting at least a portion of the backing material in the gap disposed between adjacent segments of weight material during the cutting operation.

In one exemplary arrangement, a servo/stepper motor with position feedback is provided. The motor may be calibrated with the controller, depending on the selected weight material used with the unit to calculate a predetermined distance that the strip of weight material travels to the cutter member. The calculated predetermined distance may be compared to the amount of individual weight segments counted by the sensor to verify that the correct number of segments were cut by the cutter member.

In one exemplary arrangement, the cutter member is mounted for selective sliding movement along a rail, transverse to an axial pathway to the strip of weight material. The cutter is configured to move in response to a signal received from the at least one sensor. In one exemplary arrangement, the cutter member is mounted to a bracket for non-rotational movement during a cutting operation. In one exemplary arrangement, the cutter may be selectively removed from the bracket and rotated to expose a different cutting area of the cutter member between cutting operations.

In one exemplary arrangement, a shaft wedge is disposed within a cutting channel disposed within a cutter base. The cutting channel is sized to receive the cutting member during a cutting operation. The shaft wedge may be actuated to contact the backing member of the strip of weight material during the cutting operation so as to spread adjacent individual weight segments apart to direct the cutting member through the backing material.

A tape removal unit may also be included for separating the common backing material from the segments of weight material and exposing adhesive on the segments of the weight material. The tape removal unit may comprise a lead roller, a directional roller, a tape drive roller, and a tape drive follower roller. The directional roller directs the backing tape away from the cutter member and thereby pulls the backing material off the individual weight segments and away from the cutter member, while maintaining tension on the backing material. In one arrangement, the tape removal unit may further comprise a slip clutch that is operatively connected to the drive roller.

In one exemplary arrangement, a splice detector is provided. The splice detector is configured to identify where backing material from different spools of material have been spliced together. The splice detector may be an optical sensor configured to detect a color change between splice tape and backing material.

In one exemplary arrangement, a marking unit is positioned adjacent the cutter member. The marking unit comprises a holding bracket for selectively retaining a marking element, and wherein the marking element is operably positioned within the holding bracket to be selectively actuated to non-destructively mark an edge of a segment of weight material. A marker cap holder that is configured to hold a cap for the marking element may also be provided, whereby the marker cap holder may be selectively actuated to place to the cap on the marking element.

Various embodiments of a weight apply member configured to receive a cut section of the segments of weight material are also disclosed. The weight apply member comprises first and second arc members connected to a center rail, wherein the first arc member has end face disposed in a first plane, and wherein the second arc member has an end face disposed in a second plane that is offset from the first plane. In one arrangement, the first and second arc members include electro/magnetic members in end faces of the first and second arc members, and when power is supplied to the electro/magnetic members, the segments of weight material are retained to the weight apply member. In another arrangement, the first and second arc members have at least one magnetic element disposed within the first and second end faces. A force sensor is connected to the weight apply member, wherein the force sensor is used to verify that a constant press force is maintained by the weight apply member during a weight apply operation.

A decoiler unit may be operably connected to the feed assembly. The decoiler unit further comprises a roller assembly for holding a rolled up strip of weight material, and a feed arrangement for directing the strip of material to the feed assembly. In one arrangement, the roller assembly includes non-driven rollers. A dampener may be operatively connected to at least one roller of the roller assembly of the decoiler unit. The dampener assembly is selectively operable to prevent decoiling of the rolled up strip of weight material.

A splice bracket may be provided. The splice bracket receives a first end portion of one rolled up strip of weight material and a second end portion of another rolled up strip of weight material and retains the first and second end portions during a splicing operation. The splice bracket includes a magnetic element that is operative to retain the weight segments of the first end portion and the weight segments of the second end portion to the splice bracket during a splicing operation.

BRIEF DESCRIPTION OF THE DRAWINGS

The features and inventive aspects of the present disclosure will become more apparent upon reading the following detailed description, claims, and drawings, of which the following is a brief description:

FIG. 6 is a front elevational view of the damping unit of FIG. 5;

FIG. 7 is side elevational view of the damping unit of FIG. 5;

DETAILED DESCRIPTION

As required, detailed embodiments of the present disclosure are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

For purposes of illustration only, the present disclosure describes the use of segmented weight material in the context of a wheel assembly for a vehicle. However, it is understood that system and methods of the present disclosure apply to other applications where additional weight may be needed. For example, the weights described herein may be used in balancing other components in both automotive and non-automotive applications.

Figure 1:
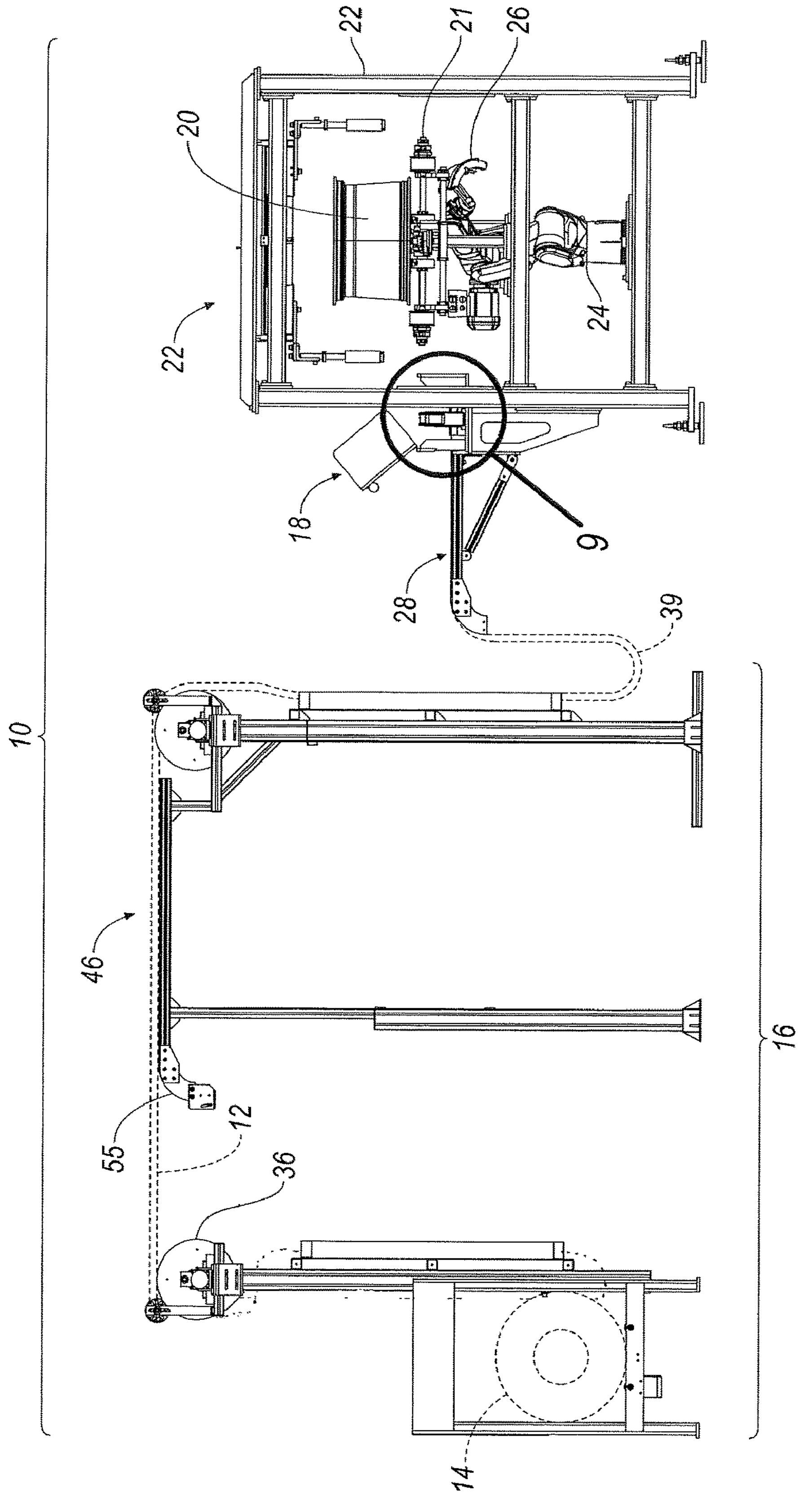
FIG. 1 illustrates an elevational view of an exemplary arrangement for a system for cutting and applying a selected amount of weight material to a rotatable element.
Figure 9:
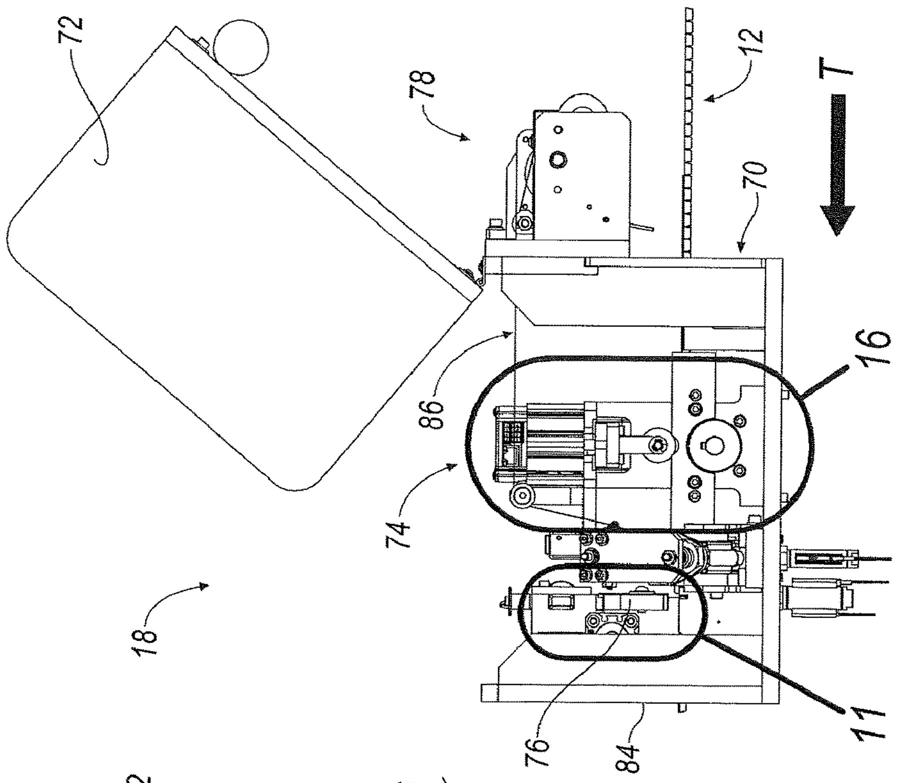
FIG. 9 is a side elevational view of the feed and cutting unit of FIG. 8.

Referring now to FIG. 1, an elevational view of a system 10 for cutting, dispensing and applying segmented weight material (shown in phantom, but shown in more detail in FIGS. 8-9, and 18) is illustrated. In one exemplary arrangement, individual weight segments having adhesive thereon, may be provided on a strip 12 of a common backing material (with the adhesive side of the weight segments being disposed on the strip 12). The individual weight segments are spaced apart from one another to define a gap between the individual weight segments. The strip may be loaded on a spool 14. The spool 14 may be mounted on a decoiler unit 16. Details of the decoiler unit 16 will be discussed in further detail below.

Figure 2:
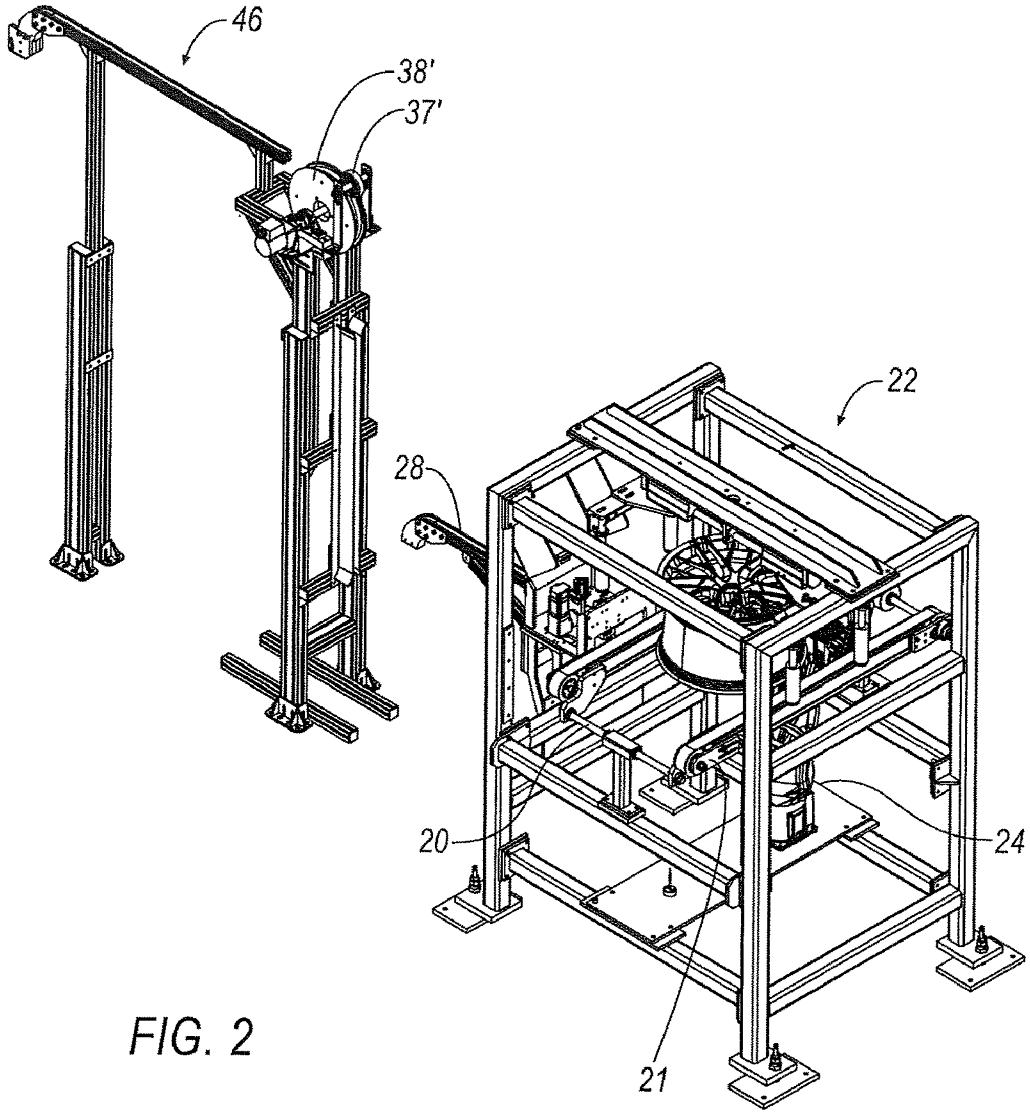
FIG. 2 is a perspective view of a portion of the system of FIG. 1.

The decoiler unit 16 connects the strip 12 of weight material to a feed and cutting unit 18. The feed and cutting unit 18 serves to advance the strip 12 by a predetermined amount, and then cuts the strip 12 to a predetermined length of individual weight segments. The weight segments may then be applied to an imbalanced member, such as wheel 20. In one exemplary arrangement, the wheel 20 may be conveyed to a conveyor station 21 in a robotic module 22, as best seen in FIG. 2. A robot 24 having a selectively moveable end of arm tool ("EOAT") 26, as best seen in FIG. 1, is operably configured to pick up the cut individual weight segments from the feed and cutting unit 18 and apply the weight segments to the wheel 20 at predetermined locations. In one exemplary arrangement, the feed and cutting unit 18 is mounted on a platform attached to the robotic module 22. A strip conveyor 28 may be provided to direct the strip 12 from the decoiler unit 16 to the feed and cutting unit 18, as well as to support the weight of the strip 12 as it is directed to the feed and cutting unit 18.

Figure 3A:
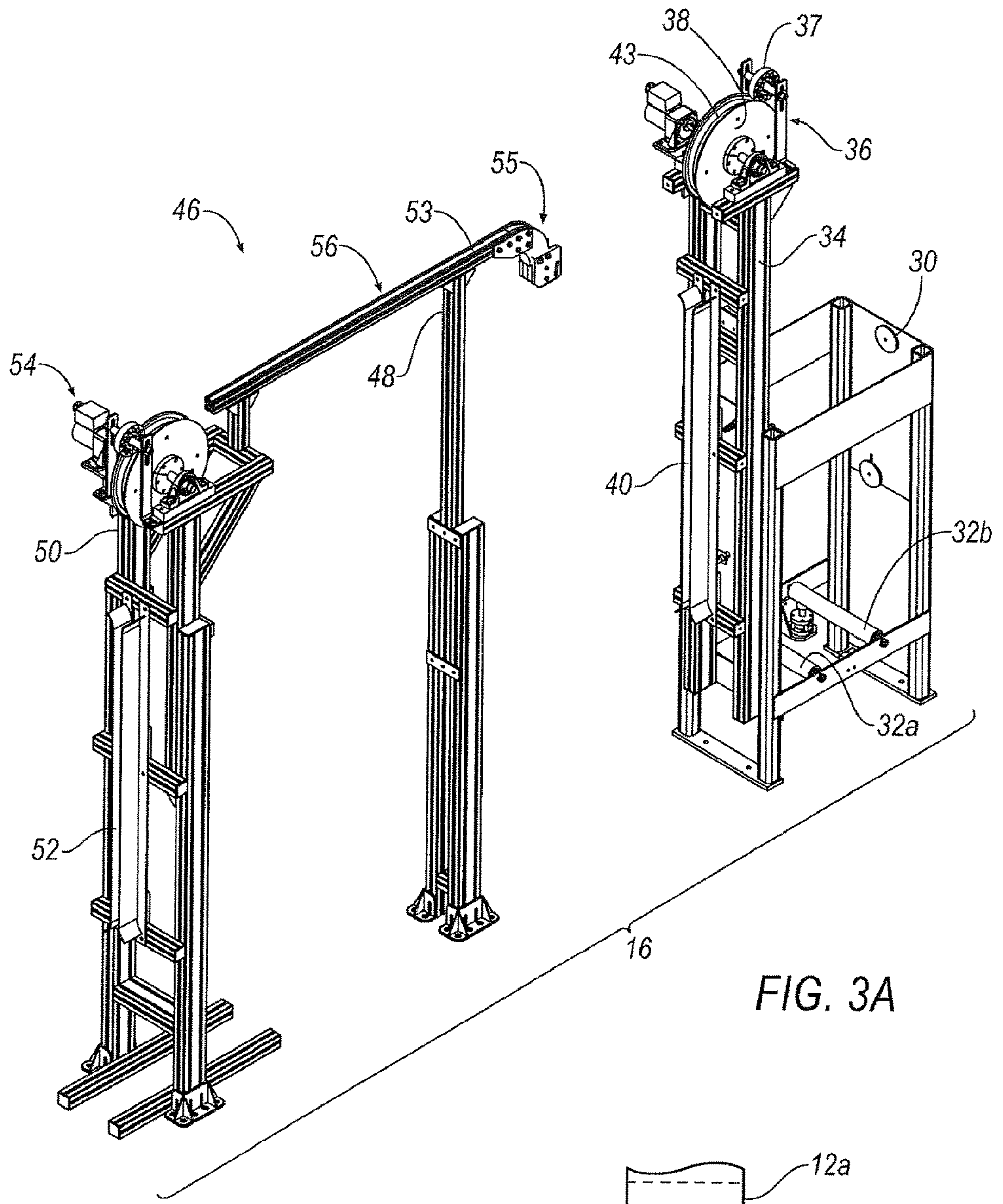
FIG. 3A is a perspective view of an exemplary feeding arrangement for the system of FIG. 1.
Figure 4:
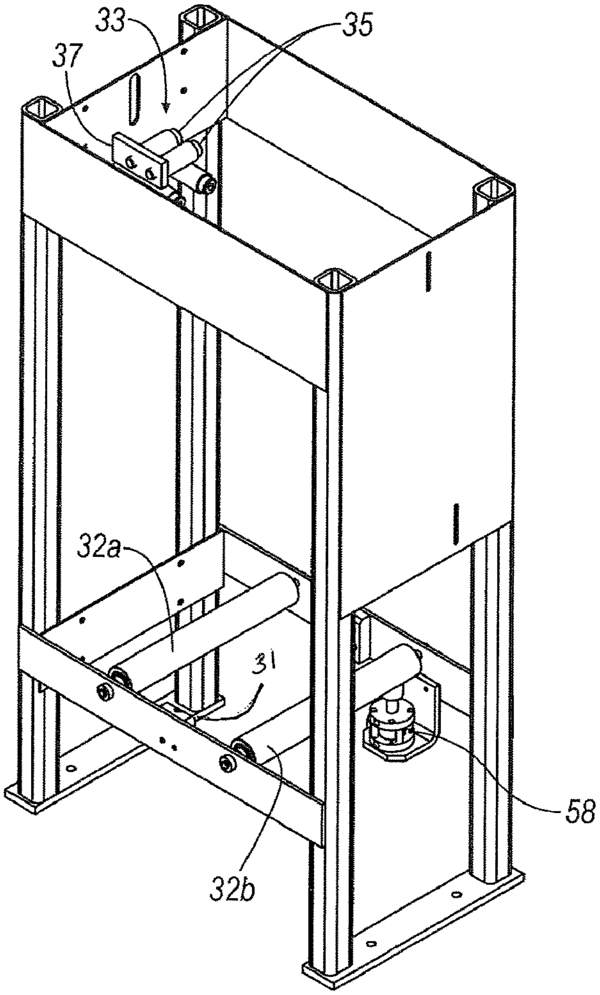
FIG. 4 is a perspective view of an exemplary arrangement of a bottom section of a weight roll decoiler assembly.

Turning now to FIG. 3A, details of one exemplary arrangement of the decoiler unit 16 will now be discussed. The spool 14 and strip 12 have been removed from FIG. 3A for ease of discussion with respect to the elements of the exemplary decoiler unit 16. The decoiler unit 16 may include a decoiler frame 30 to which a pair of rollers 32*a*, 32*b* are mounted for rotation. Rollers 32*a*, 32*b* are arranged so as to be spaced apart a predetermined distance, but disposed parallel to one another. The rollers 32*a*, 32*b* may be non-driven rollers. The spool 14 is typically placed on the rollers 32*a*, 32*b* and the weight of the spool 14 itself is used to decoil the spool 14. One or more extension elements 34 extends upwardly from the decoiler frame 30. A roller unit 33 may be mounted to the decoiler frame 30 (best seen in FIG. 4), that includes a pair of rollers 35 rotatably mounted thereto. Rollers 35 are disposed in a parallel arrangement, with a narrow space therebetween. The space between the rollers 35 is sufficiently wide enough for the strip 12 of weight material to be directed. A bracket 37 to which the rollers 35 are mounted for rotation, may be secured to part of the decoiler frame 30. A friction roller assembly 36 is mounted to the extension element 34. The friction roller assembly 36 includes a guide roller 37 and a rotating guide member 38. The guide member 38 further includes a channel 43 that receives the strip 12 of weight material from the spool 14 (as shown in FIG. 1). The guide roller 37 serves to push the strip 12 of weight material in the channel 43 such that the strip 12 is directed over the rotating guide member 38. Disposed in line with rotating guide member 38 is an elongated tape guide 40. Tape guide 40 includes opposing walls that define a channel therewithin, through which the strip 12 is directed. Either end 40*a*, 40*b* of the tape guide 40 may be flared outwardly to prevent bunching of the strip 12 of material.

One or more sensors (examples shown in FIG. 30, $S_1$ $S_2$) that are operatively connected to a controller may be positioned within the channel to verify the presence of the strip 12 within the tape guide 40 such that a degree of slack is provided in the strip 12 during a feed and cutting operation. More specifically, as shown in FIG. 1, the decoiler unit 16 may create a loop 39 from the strip 12 of weight material to provide a degree of slack in the feeding operation. The loop 39 serves as a weight buffer that will allow a changeover of a spool 14, without immediately affecting the functionality of the system 10. In other words, weight segments may still continue to be cut from the strip 12 of weight material, even while the spool 14 is being changed, thereby improving efficiency as production need not be stopped.

The decoiler unit 16 may further include a weight material usage monitoring system. In one exemplary arrangement, the weigh material usage monitoring system includes at least one optical sensor that may be mounted on a portion of the decoiler frame 30. The sensor 31 (best seen in FIG. 4) may be arranged so as to "see" a portion of the spool 14 when loaded. When the spool 14 gets to a predetermined usage size (i.e., the spool 14 will become smaller as the weight material is used), the sensor will communicate with a controller for the system 10 to provide an indication to the user that the weight material in the spool 14 is running low. In one exemplary arrangement, the indication may be a sound, like an alarm, a visual indicator like a light, a text communication on an operator screen, or a combination of one or more of the above. When the spool 14 of material completely depletes the weight material, in one exemplary arrangement, the empty spool 14 will fall through the rollers 32*a*/32*b* and the sensor will communicate with the controller to send an indication (in the form described above) that the spool 14 must be replaced.

Figure 3B:
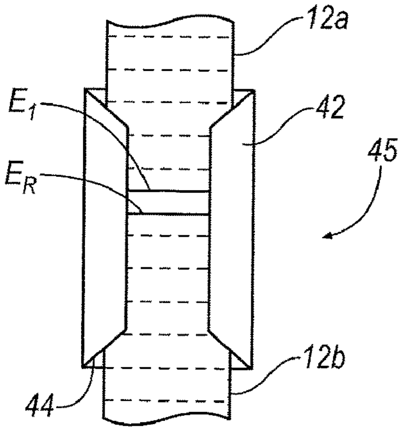
FIG. 3B is an enlarged view of a splice bracket shown in FIG. 3A.
Figure 37:
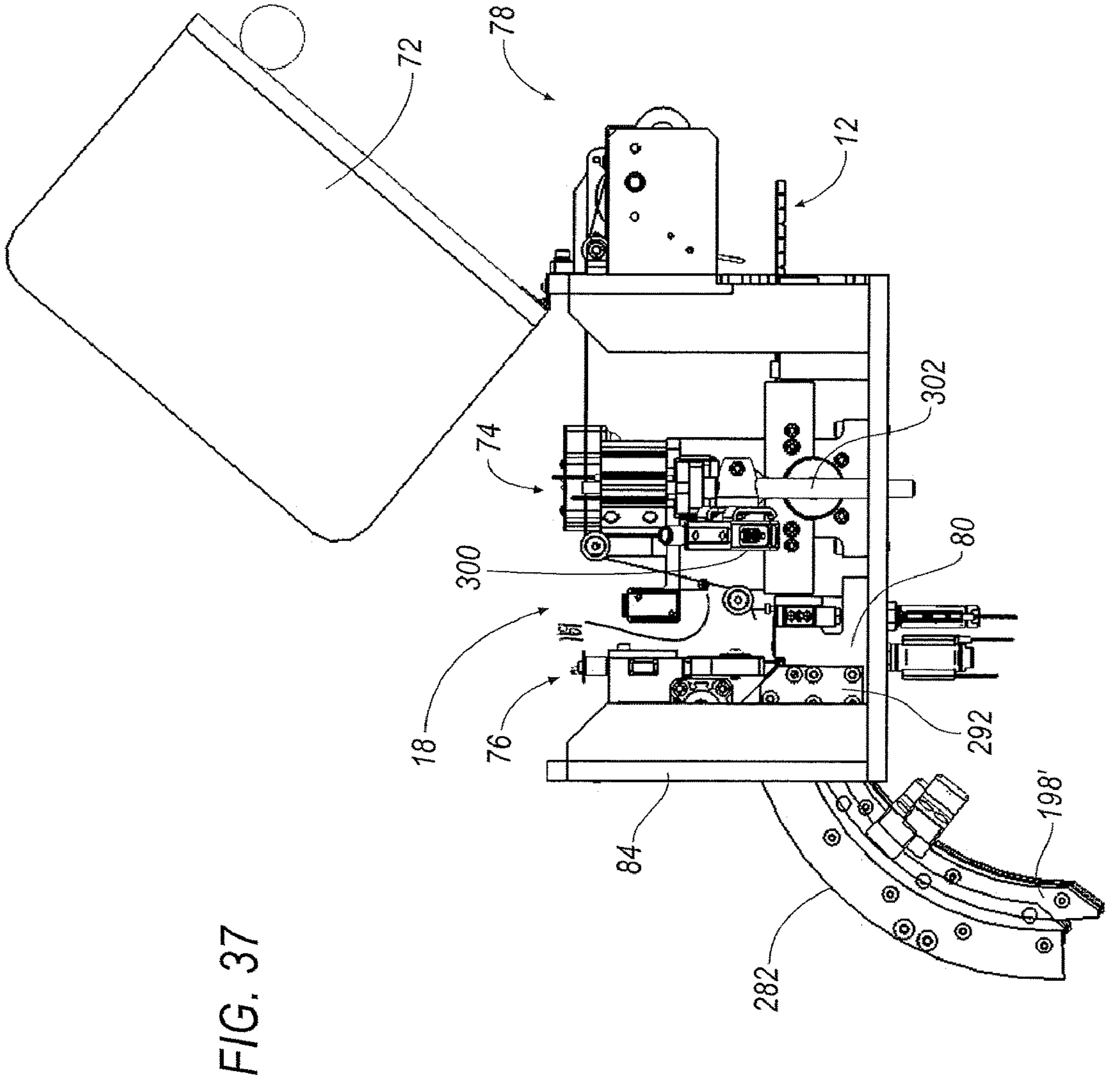
FIG. 37 is a side elevational view of an alternative arrangement of a feed and cutting unit, with an "end of arm tool" mount for another alternative arrangement of an "end of arm tool".
Figure 38:
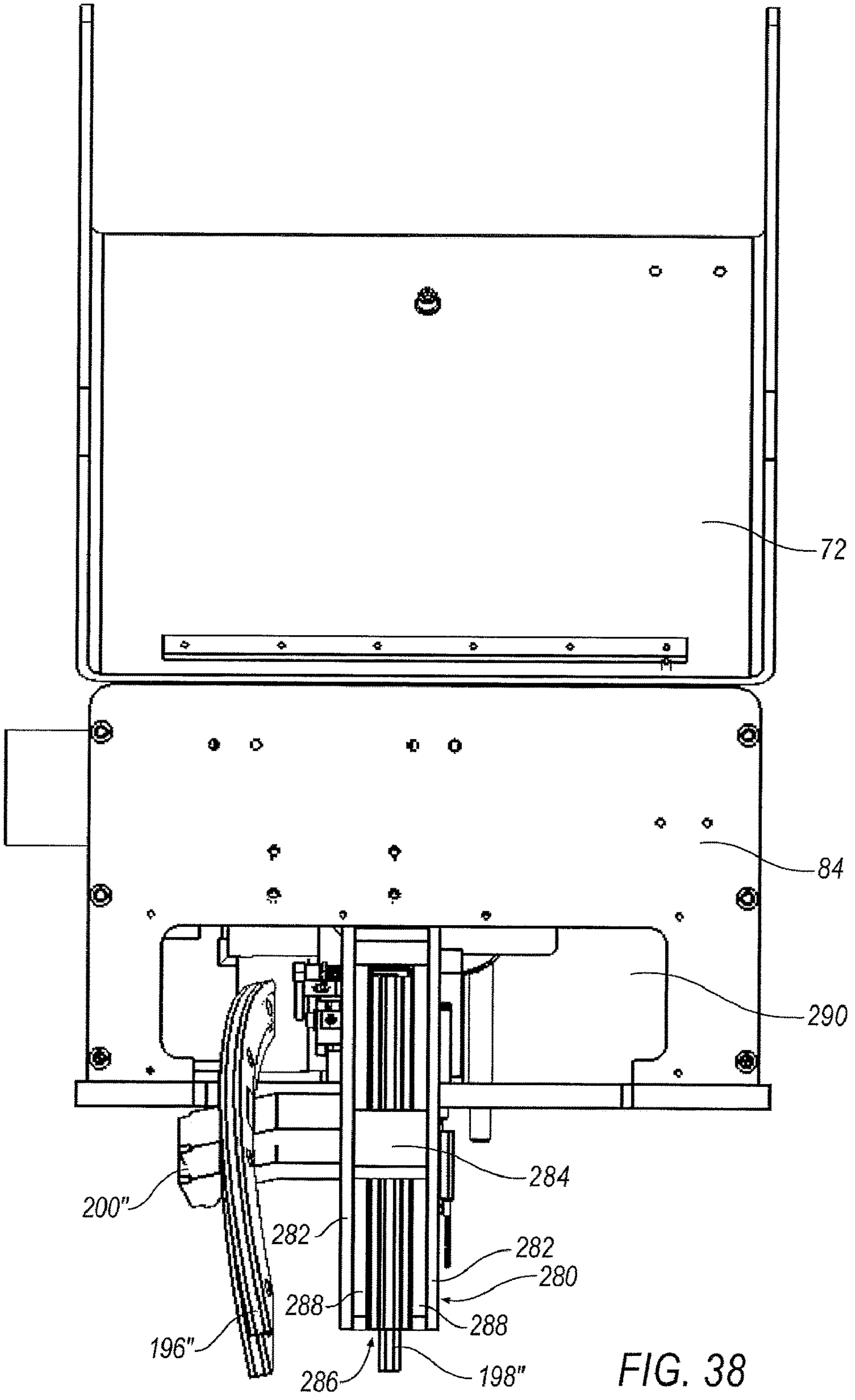
FIG. 38 is a side elevational view of the feed and cutting unit of FIG. 37.
Figure 39:
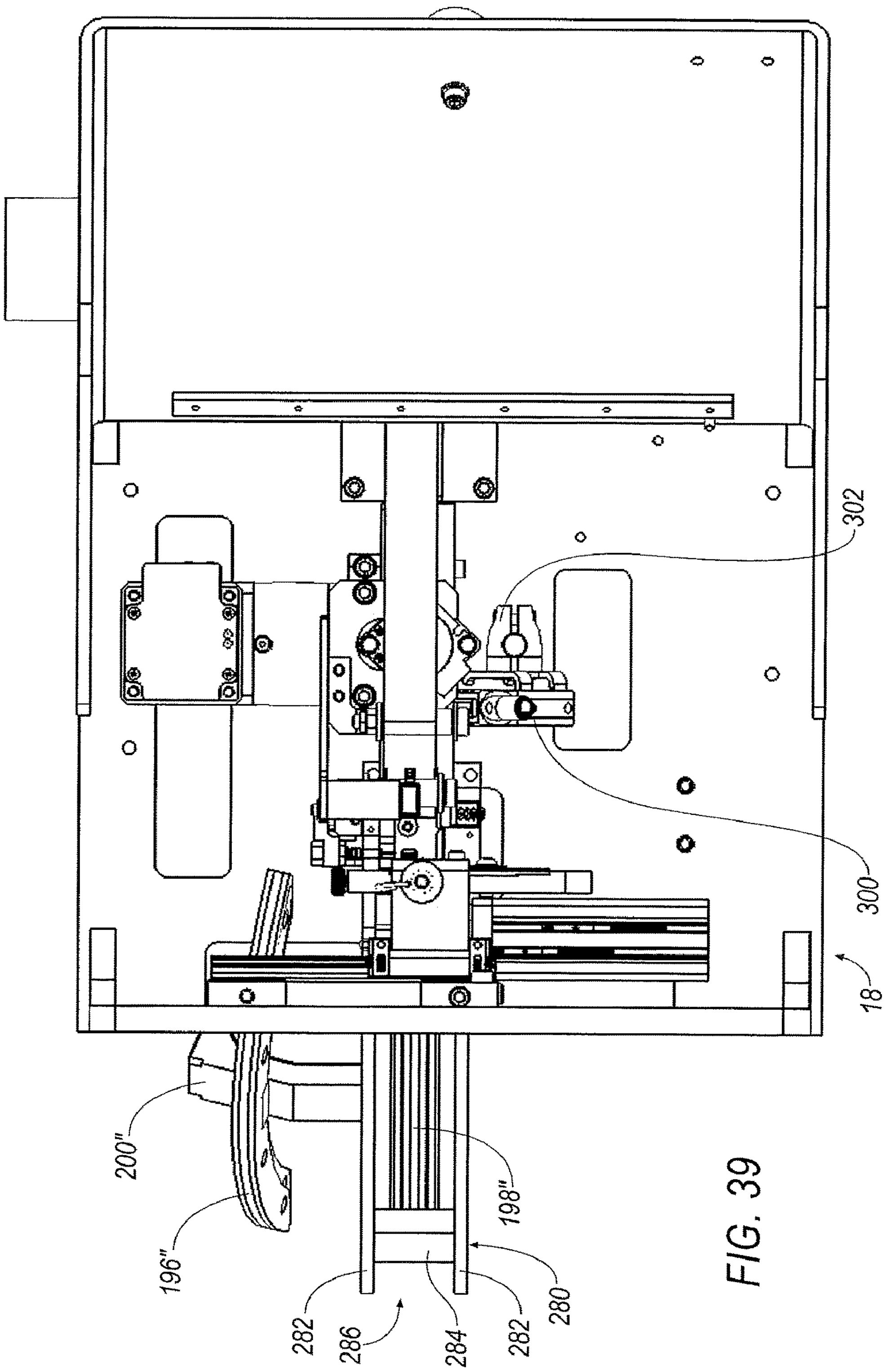
FIG. 39 is a top plan view of the feed and cutting unit of FIG. 37.
Figure 40:
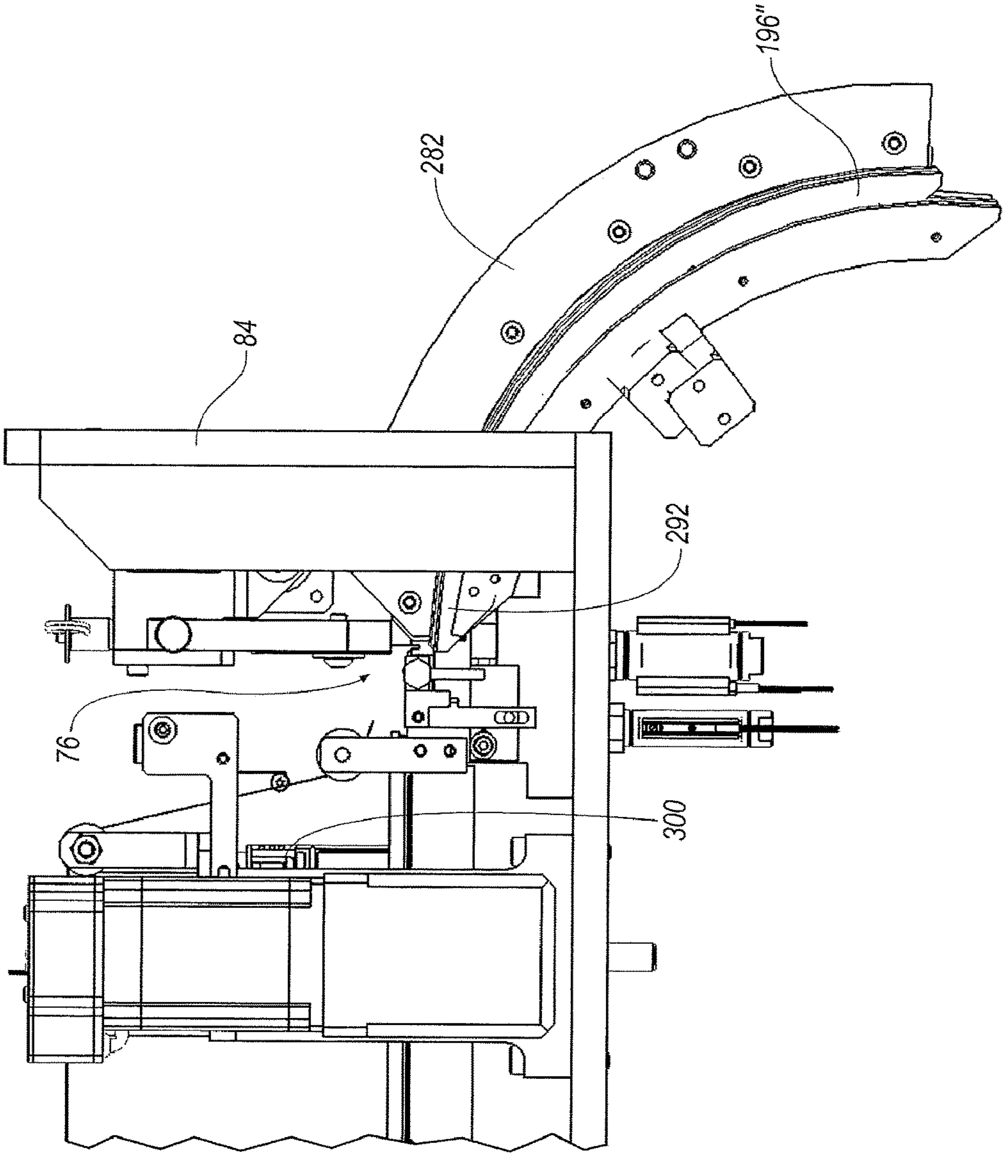
FIG. 40 is an enlarged rear elevational view of a portion of the feed and cutting unit of FIG. 37.

When the strip 12 of material from a spool 14 has been exhausted, a terminal end of the strip 12*a* may be spliced with a leading end of a strip 12*b* from a new spool 14. In one exemplary arrangement, the extension element 34 may further include a splice bracket 45. In one exemplary arrangement, the splice bracket 45 is positioned opposite to the tape guide 40 (i.e. on side 47, as best seen in FIG. 1). Splice bracket 45, an enlarged view of which is shown in FIG. 3B, may include a pair of opposing arms 42 attached to a backing member 44. An inside surface 49 of opposing arms 42 are spaced away from the backing member 44 to allow a slight clearance for the strip 12 of weight material to pass through. A magnet (not shown) may be disposed behind the backing member 44, which may be mounted to extension element 34. The arms 42 cooperate to retain edges $E_1$ and $E_2$ of two aligned and abutting end sections of strips 12*a* and 12*b* within the splice bracket 45, while the magnet serves to magnetically retain the weight material to the splice bracket 45 in a stationary manner during a splicing operation. In an alternative arrangement, a slider element that fits over splice bracket arms 42 may serve to automatically retain the edges E and $E_2$ within the splice bracket 45. A common splice tape (not shown) is used to join the backing material of strips 12*a* and 12*b*. To easily identify a splice section (as will be discussed below in connection with FIG. 37, it is contemplated that the splice tape will optically distinguishable from the sections 12*a* and 12*b* of strips of material. For example, it is contemplated that the splice tape will be a different color than the sections 12*a* and 12*b*.

Decoiler frame 30 may be positioned adjacent to the feed and cutting unit 18 such that the strip 12 of weight material feeds from the tape guide 40 to the strip conveyor 28. However, in some instances, it may not be possible to directly position the decoiler frame 30 adjacent to the feed and cutting unit 18, due to space constraints. Accordingly, in some exemplary arrangements, one or more connector sections 46 may be provided. An exemplary connector section 46 is illustrated in FIGS. 1-3. Connector section 46 includes first and second leg elements 48, 50, a tape guide 52, a friction roller assembly 54, and a conveyor section 56. The conveyor section 56 extends between first and second leg elements 48, 50 and includes a channel 53 to receive the strip 12 of weight material therein. The tape guide 52 is similar to tape guide 40, described above. The friction roller assembly 54 may also be similar to friction roller assembly 36, including having a rotating guide member 38 and a guide rollers 37. Further, guide member 38 may be motorized to provide a predetermined feed rate to the decoiler unit 16, or if needed to reduce weight drag on the conveyor section 56. As may be seen in FIG. 1, the strip 12 of weight material is directed from the friction roller assembly 36 to the conveyor section 56. In one exemplary arrangement, the conveyor section 56 may include a downwardly extending arcuate end 55. This configuration of end 55 will permit some slack between decoiler unit 16 and connector section 46, if needed. In one embodiment, the strip 12 may be directed down into the tape guide 40 and looped back up to the conveyor section 56. From the conveyor section 56, the strip 12 of weight material extends through the friction roller assembly 54 and down the tape guide 52. From the tape guide 52, the strip 12 of weight material will be directed to the strip conveyor 28 that feeds into the feed and cutting unit 18.

Figure 5:
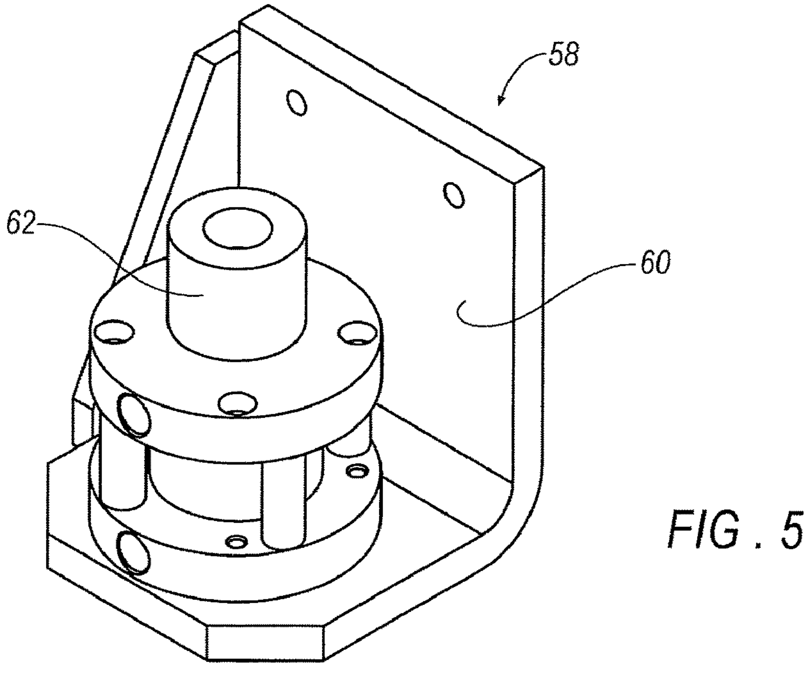
FIG. 5 is an enlarged view an exemplary arrangement of a damping unit for use with a weight roll decoiler assembly.

At times, the weight of the spool 14 may cause the strip 12 of material to unintentionally unravel from the spool 14, even when the feed and cutting unit is not operating. To prevent such unintentional decoiling of the spool 14, a damping unit 58 (best seen in FIGS. 5-7) may be provided. The damping unit 58 is configured to frictionally engage one of rollers 32*a*, 32*b*, thereby stopping the spool 14 from decoiling. The damping unit 58 may be provided on bracket 60 that is connected to the decoiler frame 30, beneath roller 32*b*. The damping unit 58 comprises a bumper element 62 that is connected to an actuated shaft member 64 by a fastening element 66. In one exemplary arrangement, damping unit 58 includes air cylinders 68 to actuate the shaft between a braked and a non-braked position. As shown in FIG. 7, when the shaft 64 is in a braked position, the bumper element 62 is frictionally engaging roller 32*b*, thereby preventing roller 32*b* from rotating.

Turning to FIGS. 8-25, details of the feed and cutting unit 18 will now be described. The feed and cutting unit 18 may be disposed within a housing member 70. A cover 72 may be hingedly connected to the housing member 70 to provide selective access to the feed and cutting unit 18.

Figure 10:
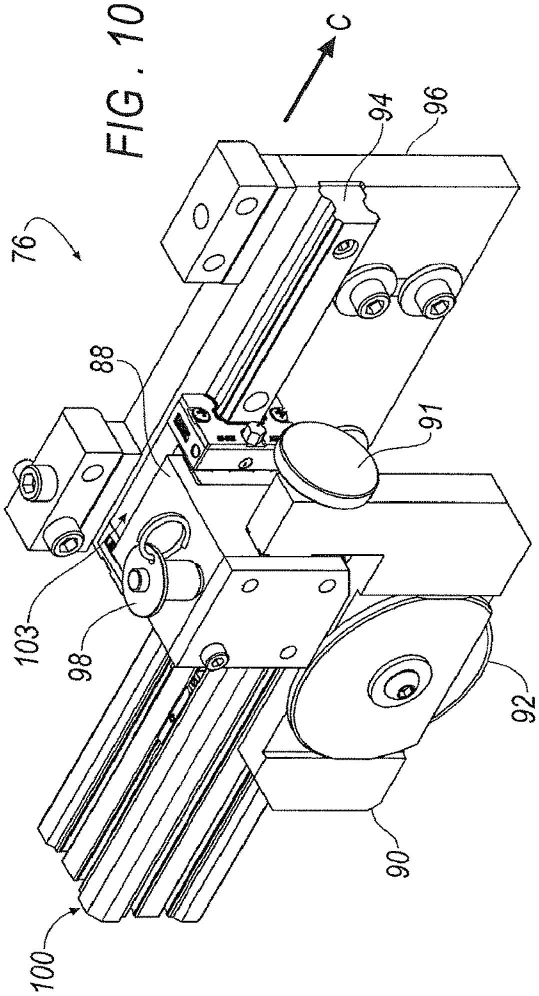
FIG. 10 is an exemplary arrangement of cutter assembly that may be incorporated into the feed and cutting unit of FIGS. 8-9.
Figure 12:
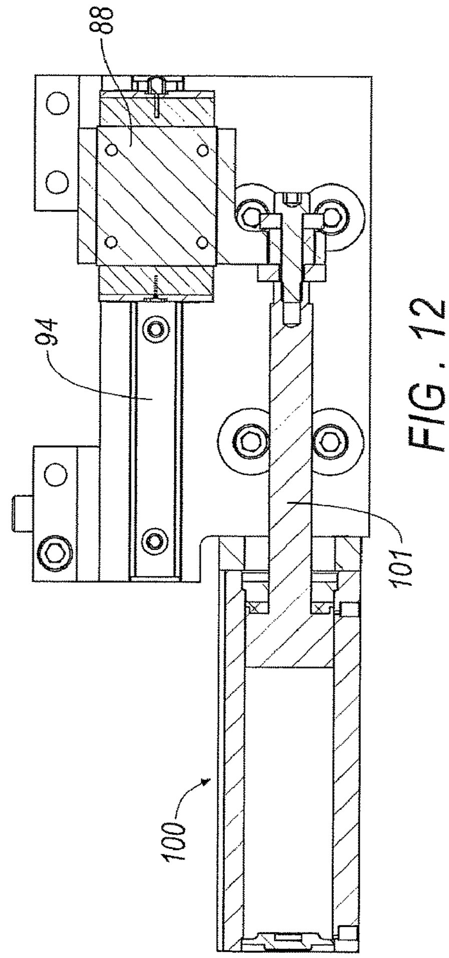
FIG. 12 is a cross sectional view of the cutter assembly of FIG. 10, taken along lines 12-12 of FIG. 10.
Figure 11:
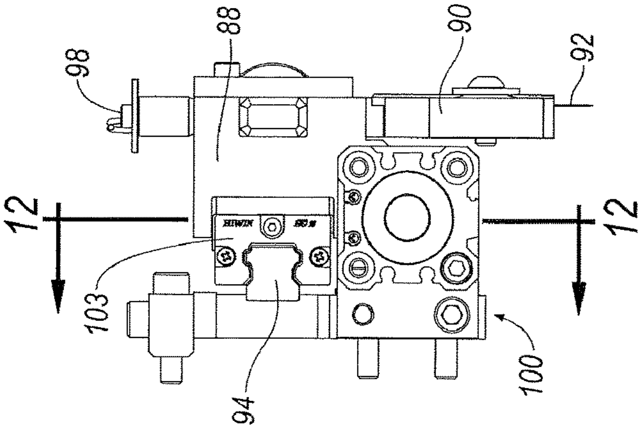
FIG. 11 is an elevational view of the cutter assembly of FIG. 10, taken from the direction of arrow R in FIG. 10.
Figure 15:
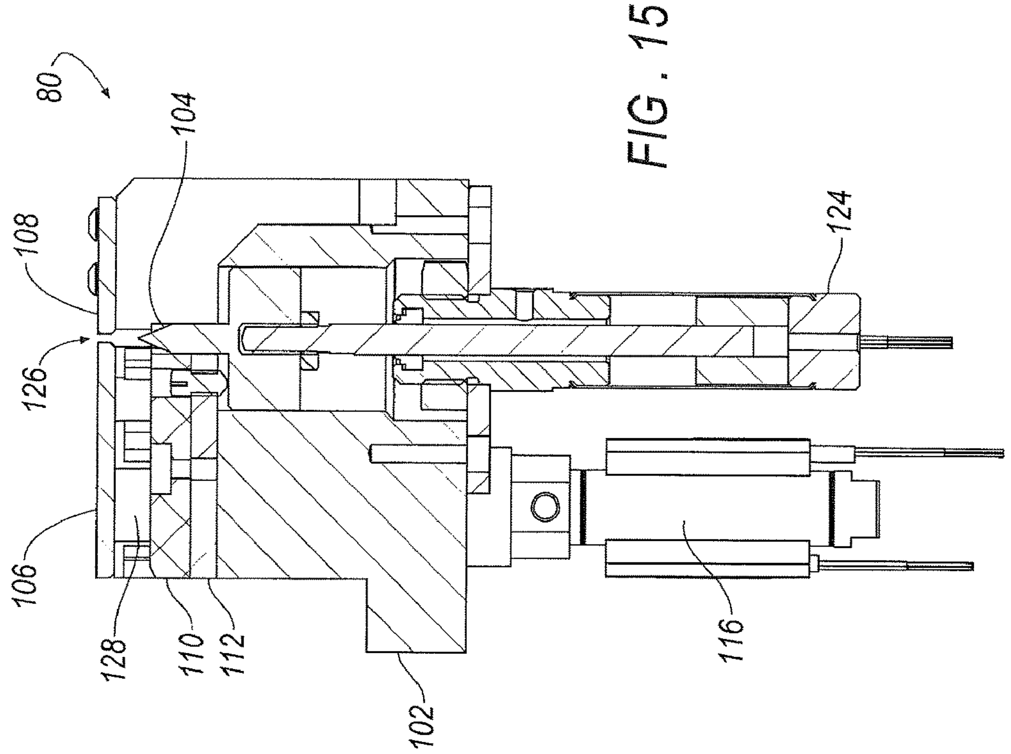
FIG. 15 is a cross-sectional view of the cutter base assembly of FIGS. 13-14, taken along lines 15-15 of FIG. 14.
Figure 24:
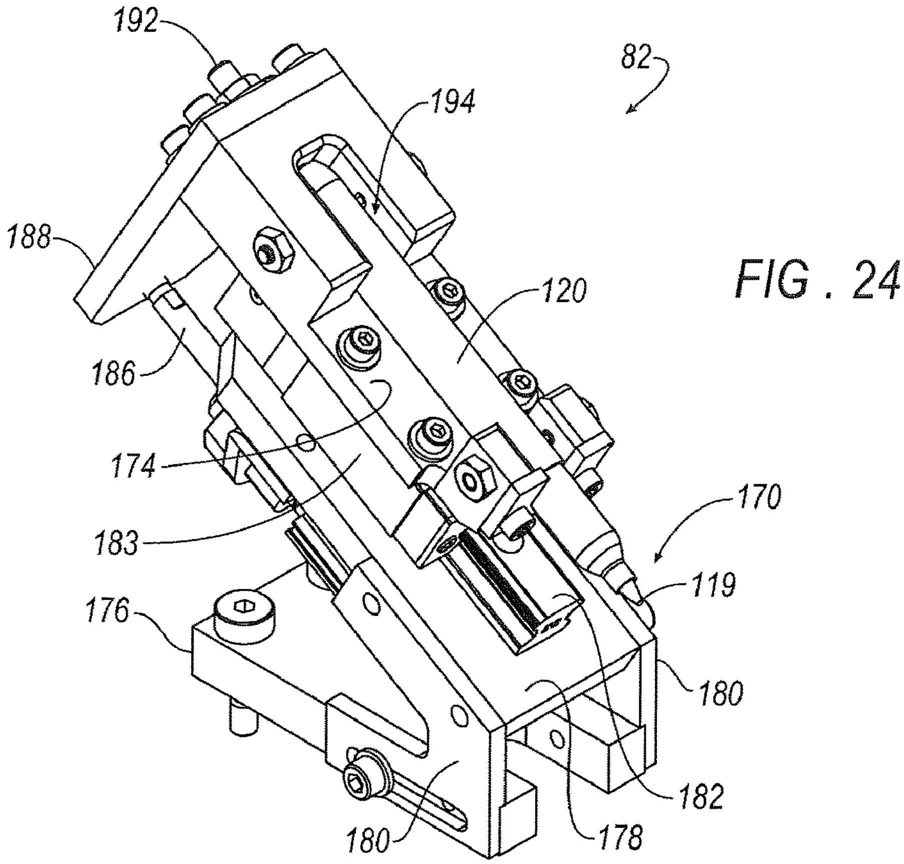
FIG. 24 is a perspective view of a marking unit that may be used with the feed and cutting unit of FIGS. 8-9.
Figure 25:
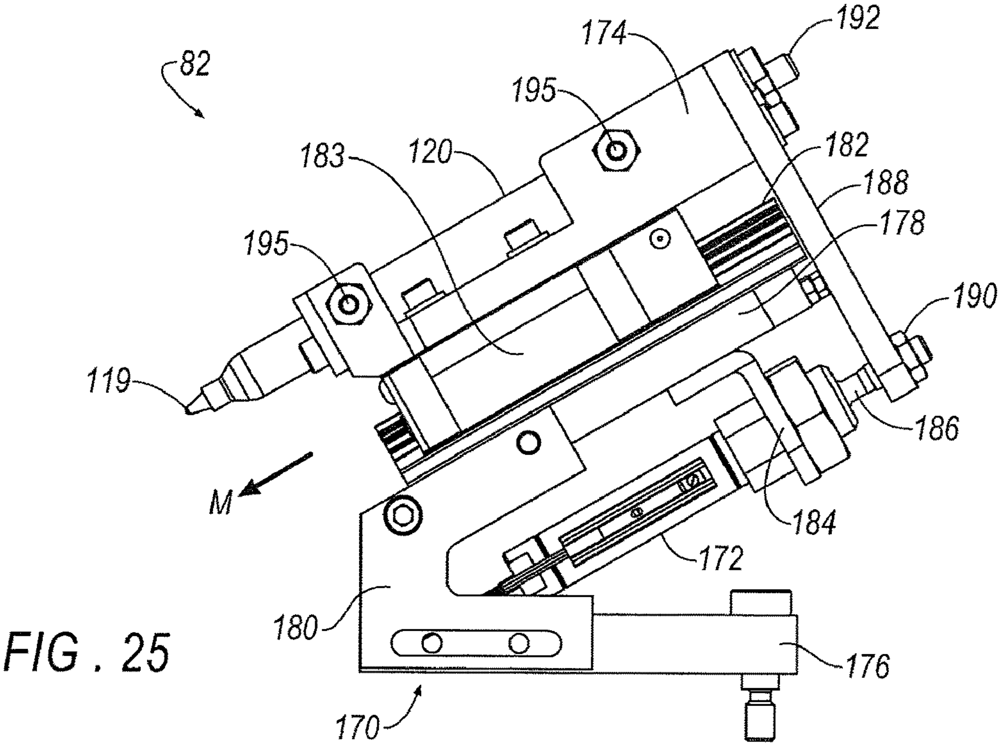
FIG. 25 is a side elevational view of the marking unit of FIG. 24.
Figure 26:
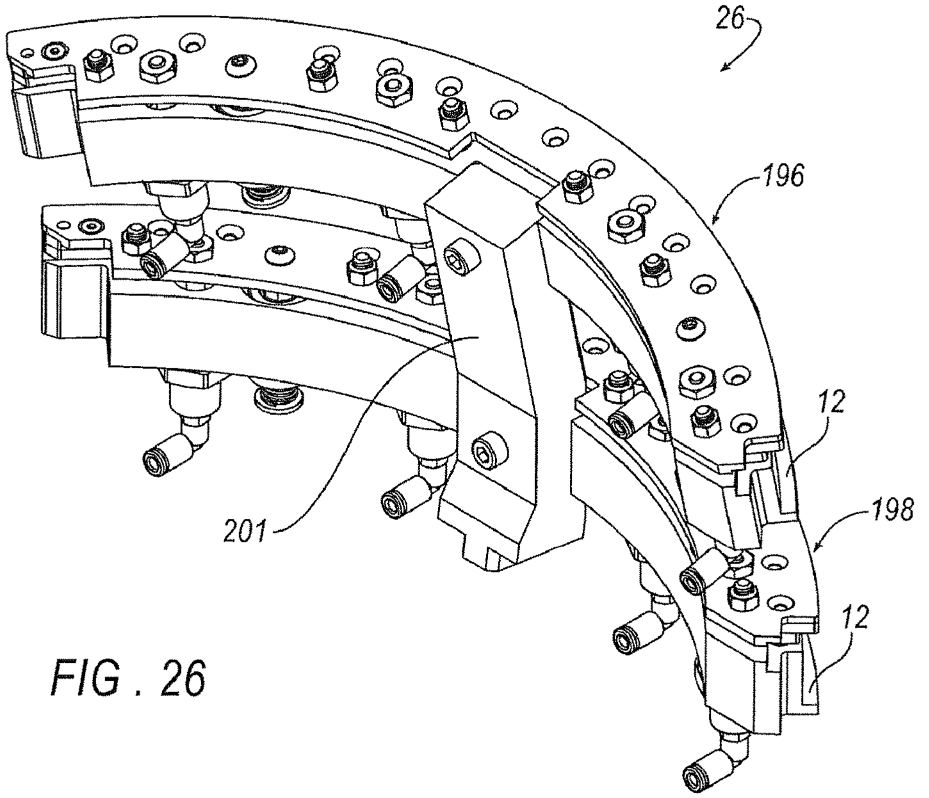
FIG. 26 is a perspective view of an exemplary arrangement of a robotic "end of arm tool" that may be used to apply weight segments to a rotational element.
Figure 27:
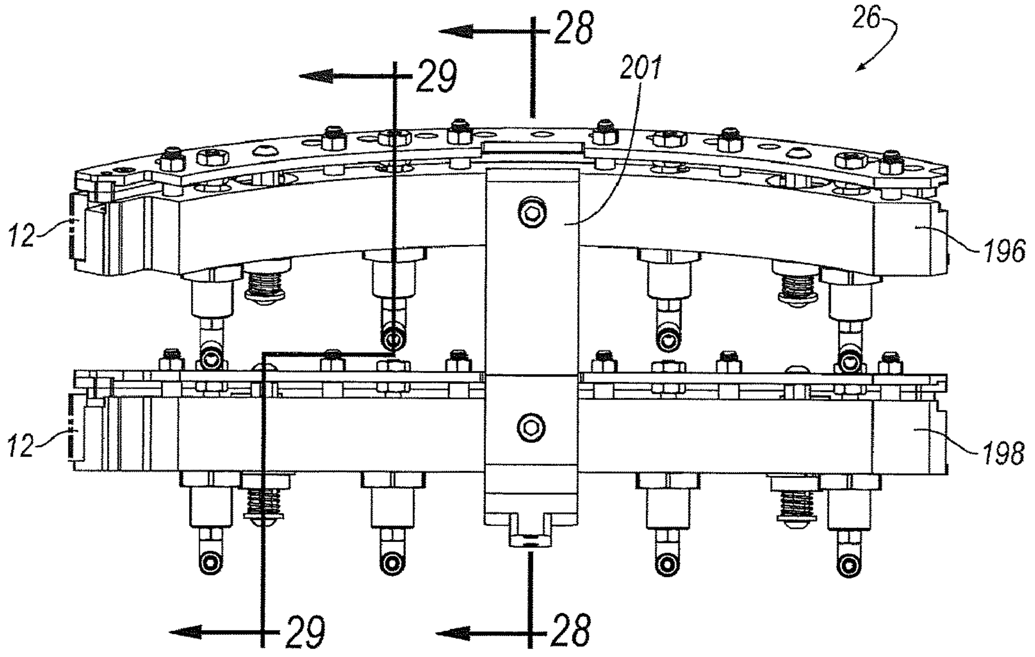
FIG. 27 is an elevational view of the robotic "end of arm tool" of FIG. 26.

The feed and cutting unit 18 comprises a feed assembly 74, at least one sensor 75 (seen in FIG. 14), a cutter member 76, and a tape removal unit 78. Details of the feed assembly 74 are shown in FIGS. 16-20. Details of the cutter member 76 are shown in FIGS. 10-12. The at least one sensor 75 may be mounted to a cutter base assembly 80, the details of which are shown in FIGS. 13-15. Details of the tape removal unit are shown in 21-23. The feed and cutting unit 18 may further comprise a marking unit 82. Details of the marking unit 82 are shown in FIGS. 24-25. The feed assembly 74 is configured to grip the strip 12 of weight material and advance the strip 12 to the cutter member 76. In one exemplary arrangement, the sensor 75 is configured to count gaps between adjacent segments of weight material on the strip 12. The sensor is positioned downstream of the feed assembly 74 along the path of travel, represented by arrow T in FIG. 9, but before the cutter member 76. In one exemplary arrangement, an encoder may be employed to measure the length of the strip 12 to be cut as a check that the correct number of weight segments are included. If there is a discrepancy between the gaps counted by sensor 75 and the encoder length, the controller can be programmed to automatically back up the strip 12 recount the strip 12 segment again.

Figure 8:
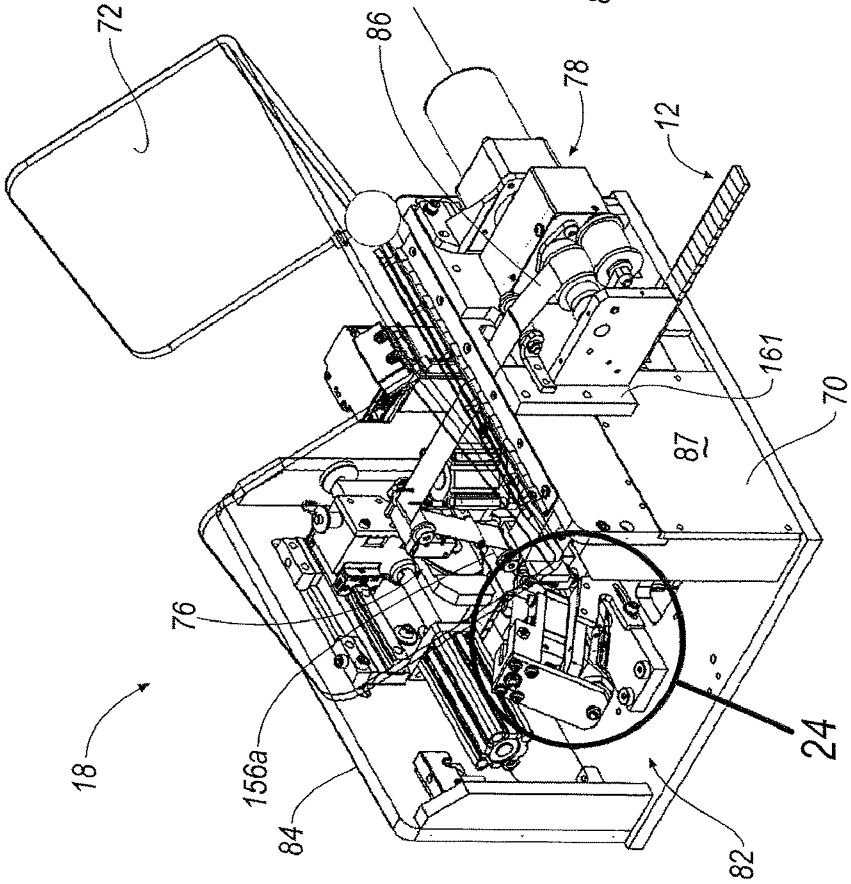
FIG. 8 is a perspective view of an exemplary arrangement of a feed and cutting unit for use with the system of FIG. 1.

The marker unit 82 is positioned between the cutter member 76 and the feed assembly 74, as shown in FIG. 8 and in enlarged view in FIGS. 24-25. The marker unit 82 is configured to non-destructively mark an outside edge of a strip 12 of weight material to be cut. More specifically, the marker unit 82 is operable to mark a specific location, based on the information gleaned from the sensor 75, on the strip 12 of weight material to ensure proper placement of a cut segment of weight material on an imbalanced element, such as wheel 20. For example, if a strip of 3 weight segments is to be cut, the cut strip should be centered on the location on imbalanced element. The marker unit 82 provides a visible indicator of where the strip of weight material should be placed. Cut segments of weight material are removed from the feed and cutting unit 18 out of an opening formed through a side panel 84 of housing 70. A main portion of the tape removal unit 78 is disposed against a side panel 87 of the housing 70. The tape removal unit 78 is configured to pull the non-adhesive backing 86 away from the strip 12 of weight material and to prevent the backing 86 from interfering with a cutting operation.

The cutter member 76 is illustrated in FIGS. 8, and 10-12. The cutter member 76 comprises mounting block 88 to which a blade bracket 90 is removable secured by a selectively actuated fastening element 91. In one exemplary arrangement, fastening element 91 is a screw fastener with a knob. However, other suitable configurations are contemplated. The blade bracket 90 carries a cutting blade 92. In one exemplary arrangement, the cutting blade 92 is fixed to the blade bracket 90 in a non-rotational manner. In other words, cutting blade 92 is does not rotate, but instead remains fixed. In one exemplary arrangement, mounting block 88 is mounted to a rail member 94 such that mounting block 88 may be selectively moved along rail member 94 to move cutting blade 92. However, it is understood, that rail member 94 may be oriented in a different manner such that the cutting blade 92 does not move axially in the cutting direction represented by arrow C in FIG. 10, but rather in an up and down direction, i.e., transverse to arrow C. The rail member 94 may be fixed to a bracket 96 that is connected to side panel 84 of housing 70. The blade bracket 90 may be selectively removed from the mounting block 88 by selectively removing pin 98. In this manner, cutting blade 92 may be selectively removed and replaced, or cutting blade 92 may be selectively rotated by a predetermined amount to expose a new cutting section of the blade to the strip 12 to be cut. Unlike systems that must cut through weight material, the blade 92 lasts much longer as it only needs to cut between adjacent weight segments, thus only cutting through the thin backing secured to the weight segments. Moreover, as the blade 92 is fixed, indexing the blade 92 to expose unused sections of the cutting blade 92 prolongs the cutting blade 92 life.

A pneumatic actuator 100 is operatively connected to the mounting block 88, as best seen in FIG. 12. The pneumatic actuator 100 is operatively connected to the controller. In response to a signal from the controller based on the sensor's 75 measurement of the gaps between adjacent weight segments, the pneumatic actuator 100 moves a piston 101 that is connected to the mounting block 88. A rail guide 103 fixed to the mounting block 88 thereby enables the mounting block 88 to slide along the rail 94 to cut a predetermined length of the strip 12 of weight material. In this manner, the cutting blade 92 is advanced over the strip 12, within a gap positioned between the adjacent weight elements secured to the strip 12.

Figure 13B:
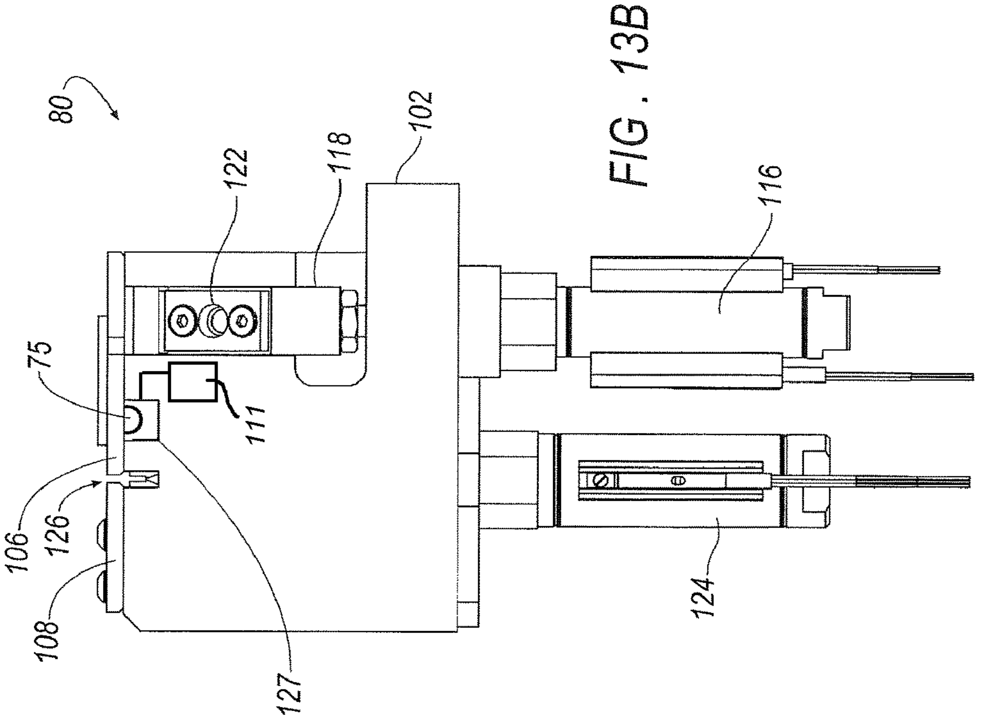
FIG. 13B is a rear elevational view of the exemplary cutter base assembly of 13A that may be incorporated into the feed and cutting unit of FIGS. 8-9.
Figure 13A:
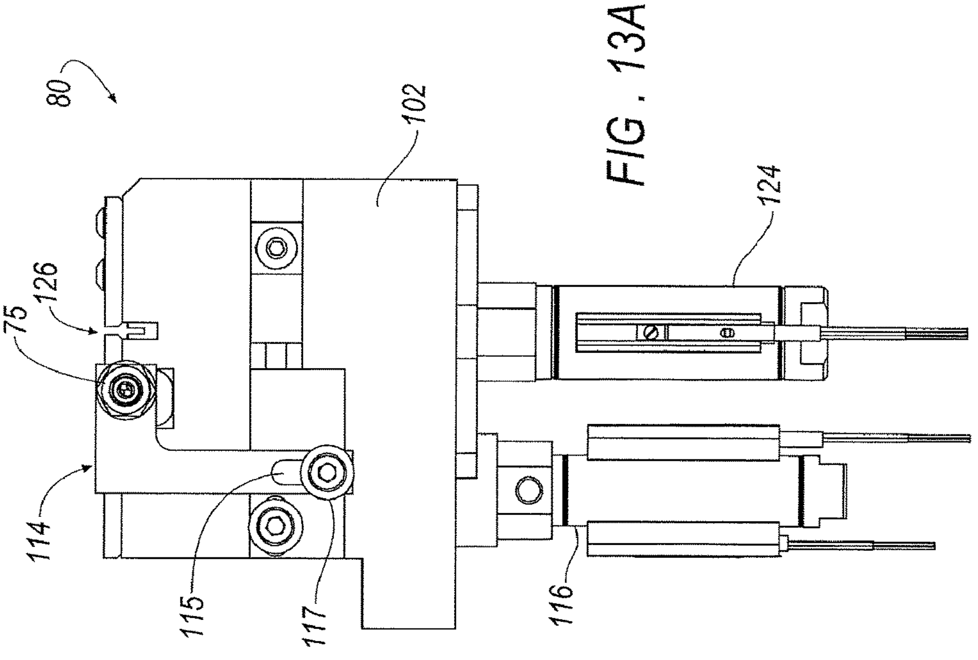
FIG. 13A is a front elevational view of an exemplary cutter base assembly that may be incorporated into the feed and cutting unit of FIGS. 8-9.
Figure 14:
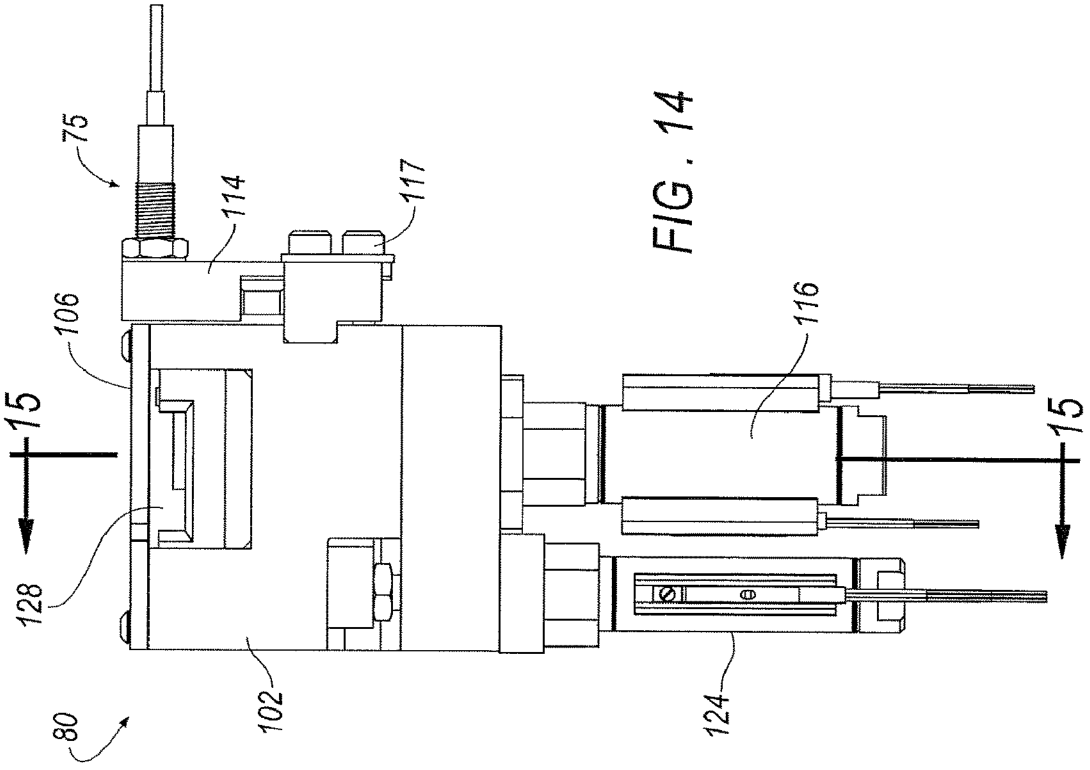
FIG. 14 is a left side elevational view of the exemplary cutter base assembly of FIG. 13, rotated by 90°.
Figure 17:
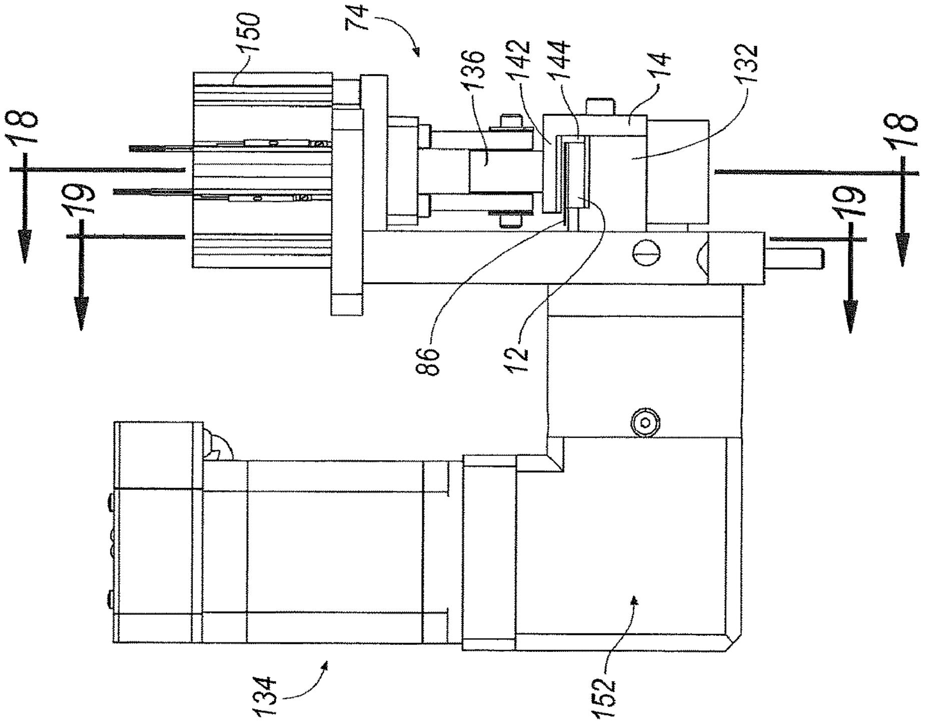
FIG. 17 is a side elevational view of feed assembly of FIG. 16.
Figure 16:
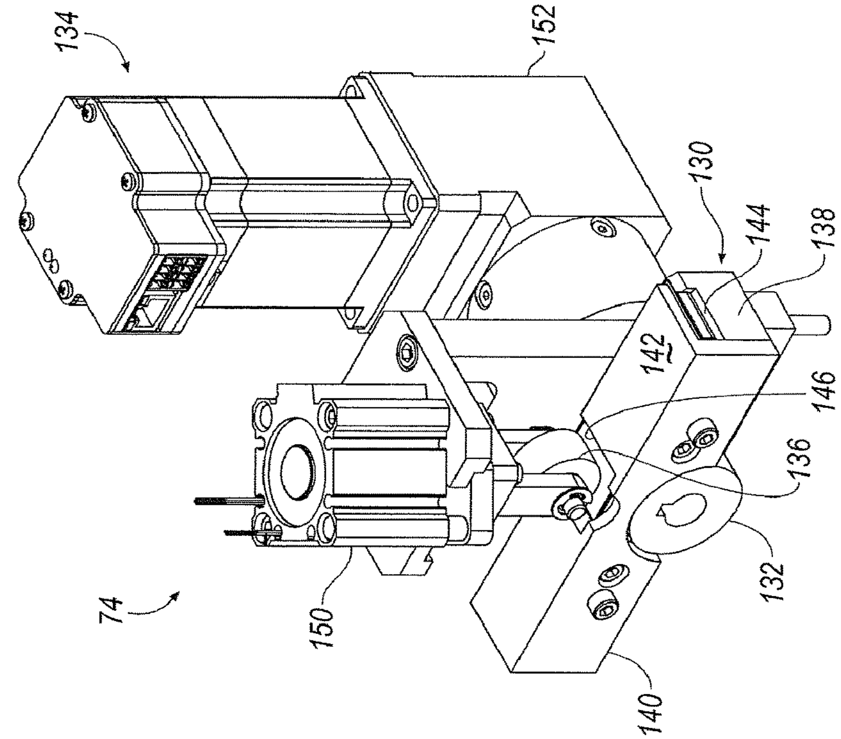
FIG. 16 is a perspective view of an exemplary feed assembly that may be incorporated into the feed and cutting unit of FIGS. 8-9.

Referring to FIGS. 13-15, the cutter base assembly 80 will now be described. In one exemplary arrangement, the cutter base assembly 80 comprises a mounting base block 102, a shaft wedge 104 (best seen in FIG. 15), first and second guides 106, 108, a guide track 110 (FIG. 15), a spacer plate 112, and a sensor bracket 114. The sensor bracket 114 carries the sensor 75. In one exemplary arrangement, the sensor bracket 114 is selectively adjustable to accommodate varying thickness of strips 12 of segmented weight material. More specifically, the sensor bracket 114 may include adjustment slot 115 (FIG. 13A) that cooperates with a fixing element 117 to selectively change the vertical height of the sensor bracket 114, and thereby the sensor 75. As may be seen in FIG. 13A, the sensor 75 is positioned adjacent a cutting channel 126, described in further detail below. The sensor 75 is also operatively connected to the controller 111 in any known manner.

Referring specifically to FIGS. 14-15, positioned between the guide track 110 and the first guide 106 is a feed channel 128. In operation, the strip 12 of weight material is directed through the feed channel 128. The sensor 75 is positioned within a groove 127 (see FIG. 13B) that is in communication with the feed channel 128. The sensor 75 operates to measure a predetermined amount of segmented weight material, based on a signal received from the controller 111, as the feed and cutting unit 18 moves the strip 12 of weight material past the sensor 75. More specifically, in one exemplary arrangement the sensor 75 is an optical sensor 75 that may be configured to count the gaps between adjacent weight segments on the strip 12.

An air cylinder 116 is operatively engaged with a marker cap holder 118. Marker cap holder 118 may be actuated by the air cylinder 116 to a stored position, whereby an exposed tip 119 of a marker element 120 (best seen in FIGS. 24-25) may be sealed within cap 122, thereby preventing the tip of the marker element 120 from being dried out.

A pneumatic actuator 124 is operatively connected to the shaft wedge 104 (best seen in FIG. 15). The shaft wedge 104 is disposed within a cutting channel 126 positioned between the first and second guides 106, 108. The cutting channel 126 is also in communication with the feed channel 128. The cutting channel 126 is sized to receive the cutting blade 92 therein during a cutting operation. The wedge 104 may be actuated upward during a cutting operation to cooperate with the cutting blade 92 in severing the strip 12 of material, so as to deliver the backing material between adjacent weight segments toward the cutting blade 92 during a cutting operation. With this configuration, the shaft wedge 104 will move adjacent weight segments apart, thereby minimizing a risk that the cutter blade 92 might come into contact with a weight segment, so as not to "nick" a weight. The shaft wedge 104 will therefore extend the life of the cutting blade 92.

Figure 20:
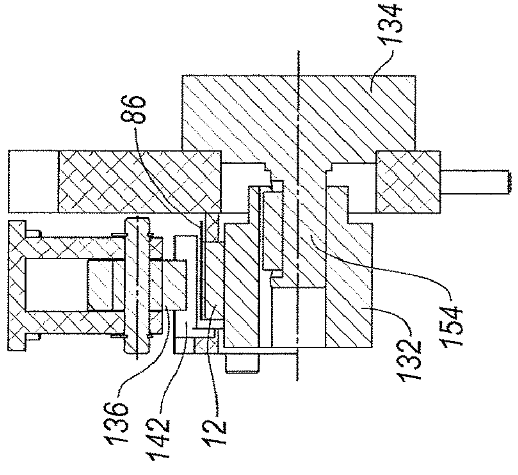
FIG. 20 is a cross-sectional view of a lower portion of the feed assembly of FIGS. 16-17, taken along lines 20-20 of FIG. 18.
Figure 19:
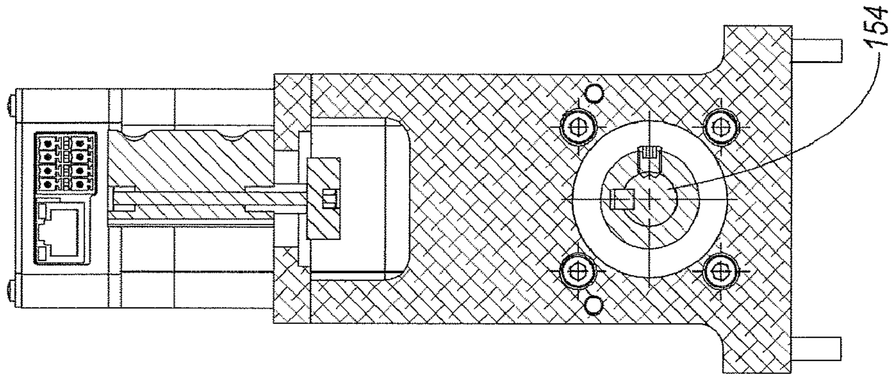
FIG. 19 is a cross-sectional view of the feed assembly of FIGS. 16-17, taken along lines 19-19 of FIG. 17.
Figure 18:
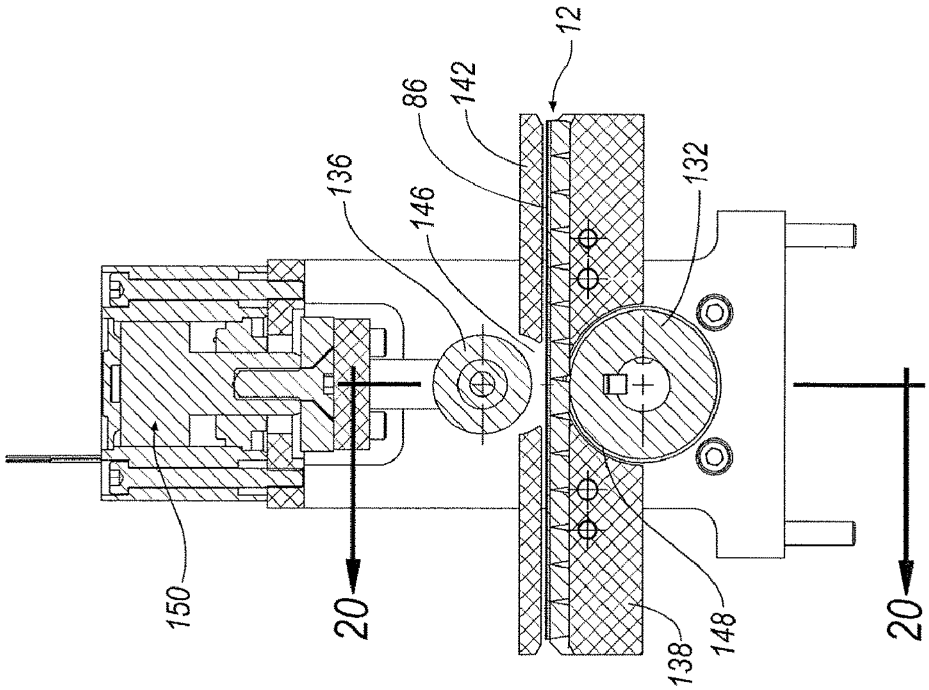
FIG. 18 is a cross-sectional view of the feed assembly of FIGS. 16-17, taken along lines 18-18 of FIG. 17.

An exemplary feed assembly 74 is illustrated in FIGS. 16-20. The feed assembly 74 comprises a roller guide 130, a drive roller 132 operatively connected to a motor 134, and an idler roller 136. In one exemplary arrangement, the roller guide 130 includes a base guide block 138 and a generally L-shaped bracket 140 that is connected to the base guide block 138. One section 142 of the bracket 140 is axially spaced from the base guide block 138 to form a slot/feed channel 144. Section 142 further includes a first open slot 146 formed through the section 142. Slot 146 provides the idler roller 136 with access to the strip 12 of weight material. Base guide block 138 also includes a second open slot 148 that is opposing the first open slot 146. The first and second open slots are both in communication with the feed channel 144. The drive roller 132 extends partially into the feed channel 144 through the second open slot 148, while the idler roller 136 is configured to selectively extend partially into the feed channel 144 through the first open slot 146, as best seen in FIGS. 18 and 20.

The idler roller 136 is operatively connected to a pneumatic actuator 150. Actuator 150 is configured to move idler roller 136, downwardly toward the first open slot 146 into an engaging position, such that a portion of the idler roller 136 extends into the feed channel 144 through first open slot 146. In this manner, rollers 132 and 136 frictionally engage the strip 12 therebetween, in a pinching manner.

The motor 134 further includes a gear box 152. A drive shaft 154 (best seen in FIG. 20) extends from the gear box 152 and engages the drive roller 132. As the motor 134 rotates the drive shaft 154 in a first direction, the drive roller 132 will rotate, thereby advancing the strip 12 of weight material in a first direction, i.e., toward the cutter member 76. If the drive shaft 154 is rotated in a second direction, the drive roller 132 will retract the strip 12 away from the cutter 76.

The motor 134 may be a servo/stepper motor with position feedback that is operatively connected to a controller. More specifically, via the controller, the motor 134 may be calibrated with the particular type (i.e., material/shape) and size of the weight material being fed into the feed channel 144 such that a set distance that the strip of material 12 needs to travel to cut a predetermined amount of segments may be calculated. In this manner, the controller can be configured to verify the amount of segments counted by the sensor 75 as compared with the calculated distance traveled by the strip of material 12 to verify that the correct amount of segments have been cut from the strip 12 of material. If a discrepancy arises, the controller may be configured to issue an alarm alerting the user to a discrepancy.

Figure 21:
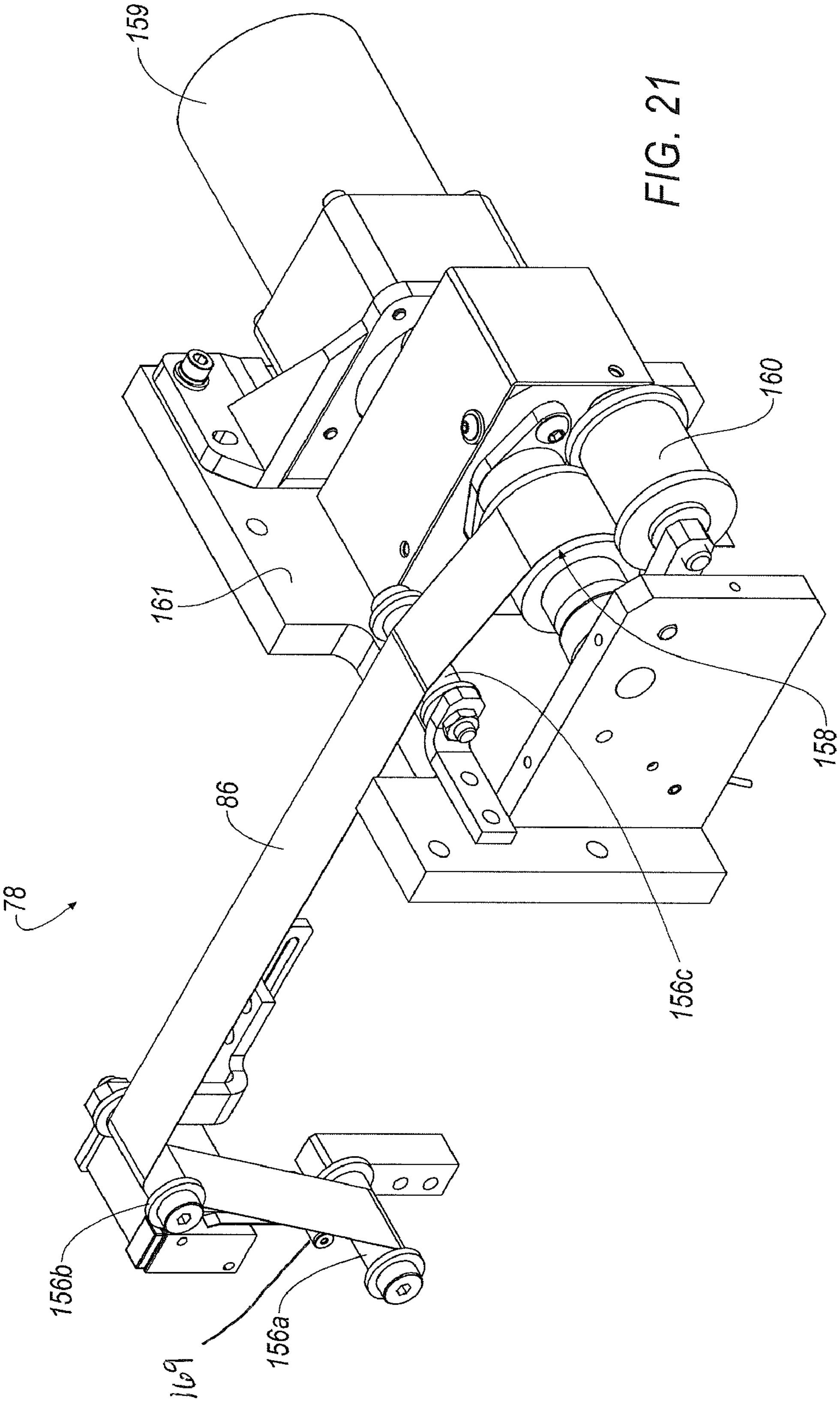
FIG. 21 is a perspective view of an exemplary arrangement of a tape removal unit that may be incorporated into the feed and cutting unit of FIGS. 8-9.
Figure 23:
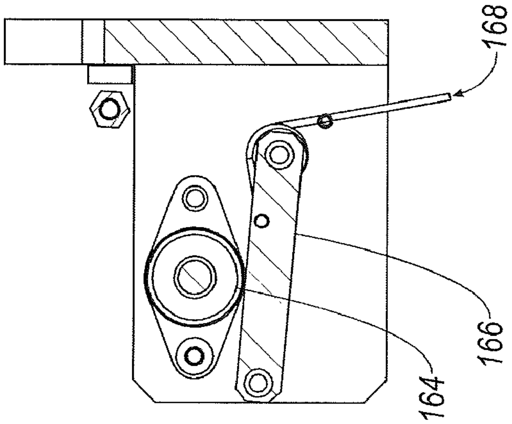
FIG. 23 is a cross-sectional view of a portion of the tape removal unit of FIG. 21, taken along lines 23-23 of FIG. 22.
Figure 22:
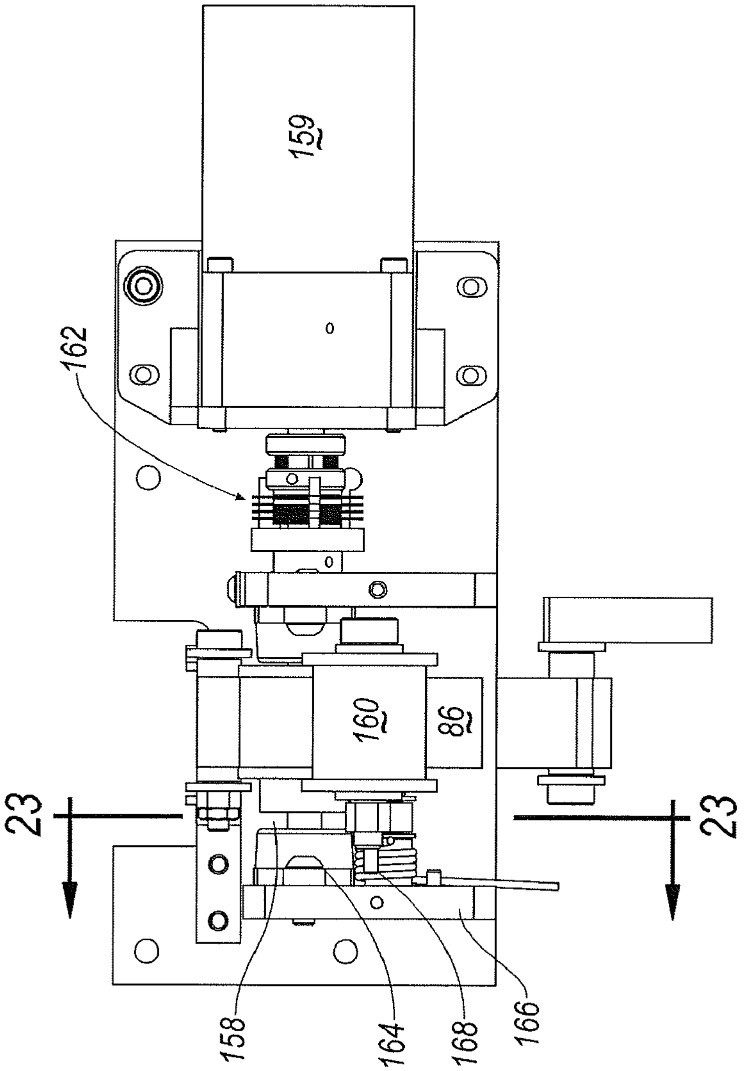
FIG. 22 is a side elevational view of the tape removal unit of FIG. 21.

Details of an exemplary arrangement of a tape removal unit 78 are illustrated in FIGS. 21-23 that may be used with the feed and cutting unit 18. The tape removal unit 78 comprises a plurality of directional rollers 156*a*, 156*b*, 156*c*, a drive roller 158 operatively connected to a motor 159, and a holddown roller 160. The tape removal unit 78 is configured to remove the backing tape 86 from the strip 12 of weight material before the strip 12 of weight material is cut by the cutting blade 92. More specifically, during a setup of the system 10, the backing tape 86 is separated from an initial segment of the strip 12, at a leading edge of the strip 12. The separated backing tape 86 is then threaded through the feed channel 144 and the cutting channel 126. The backing tape 86 is then directed over the lead directional roller 156*a*. Directional roller 156*a* is positioned adjacent cutter base assembly 80 and directs backing tape 86 upwardly and away from the cutter member 76.

Backing tape 86 is then directed over directional roller 156*b*, through an opening in side panel 87 (see FIG. 8) and over directional roller 156*c*. In one exemplary configuration a mounting bracket 161 is secured to side panel 87 of housing 70 onto which directional roller 156*c*, drive roller 158 and holddown roller 160 are mounted. After being directed over the directional roller 156*c*, the backing tape 86 is further directed onto drive roller 158. Holddown roller 160 is positioned adjacent drive roller 158 such that backing tape 86 is directed between drive roller 158 and holddown roller 160. Motor 159 operates to rotate drive roller 158 to pull backing tape 86 down between the drive roller and holddown roller 160, while maintaining tension on the backing tape 86 during removal.

Referring to FIG. 22, a slip clutch 162 is positioned between the motor 159 and the drive roller 158. The slip clutch 162 operates to maintain tension on the backing tape 86. A drive shaft extends through the drive roller 158 and is engaged to a flange bearing 164 (best seen in FIG. 23). The flange bearing 164 is in contact with a roller arm 166. A biasing member 168 is connected to the roller arm 166. In one exemplary arrangement, the biasing member 168 is positioned between the roller arm 166 and a portion of the holddown roller 160. The holddown roller 160 serves to direct the backing tape 86 to a suitable waste receptacle, away from both the cutter blade 92 and from the robot 24.

The tape removal unit 78 may further comprise a tension detection sensor 169. Tension detection sensor 169 is best seen in FIG. 20. In one exemplary arrangement, tension detection sensor 169 is positioned adjacent the first directional roller 156*a* so as to be in contact with the backing tape 86 as it is being directed up through the tape removal unit 78. The tension detection sensor 169 is configured as a mechanical switch that that communicates with the controller to indicate whether an acceptable amount of tension is present on the backing tape 86 as it is being removed from the weight segments 12. As may be seen in FIG. 37, tension detection sensor 169 is mounted upstream of the cutter blade 92.

Details of an exemplary marking unit 82 are shown in FIGS. 24 and 25. The marking unit 82 is positioned between the feed assembly 74 and the cutter member 76 (see, e.g. encircled area 24 in FIG. 8). The marking unit 82 comprises a holding bracket 170, a pneumatic actuator 172, and a marker element holder 174 that receives marker element 120.

The holding bracket 170 includes a subplate 176, a rail plate 178 and opposing side plates 180. The subplate 176 is configured for mounting on housing 70, as best seen in FIG. 8. On one side of the rail plate 178 a rail member 182 is fixed. A carrier member 183 is secured to a bottom surface of the rail plate 178. The carrier member 183 includes a mounting channel that has a complimentary cross-section to the rail member 182, such that the rail member 182 may be received therein. A portion of the marker element holder 174 is secured to the rail member 182 via the carrier member 183 such that the marker element holder 174 may be selectively moved to engage the tip 119 of the marker element 120 against a peripheral edge of a weight segment of the strip 12 of weight material at a predetermined location. More specifically, the actuator 172 is connected to a cylinder bracket 184 that is fixed to the rail plate 178. A plunger element 186 of the actuator 172 is connected to a cylinder plate 188 via a fastening element 190. The cylinder plate 188 is also operatively connected to a spring plunger 192 that extends through the cylinder plate 188 and into a marker channel 194 of the marker element holder 174. The spring plunger 192 contacts an end of the marker element 120, opposite the marker tip 119. In operation, when the actuator 172 is activated to mark a weight segment, the actuator 172 will move in direction M, thereby pulling the cylinder plate 188 toward the strip 12 of material disposed within the feed channel 128 of the base cutting assembly 80, against the biasing force of the spring plunger 192 and along the rail member 182. The spring plunger 192 will operate to return the marker element 120 to a non-marking position when the actuator 172 is deactivated. Various selectively removable retaining elements 195 serve to retain the marker element 120 within the marker holder 174, but allow the marker element 120 to be replaced, as needed or desired (if, for example a different color marker element 120 is desired to be used).

Figure 28:
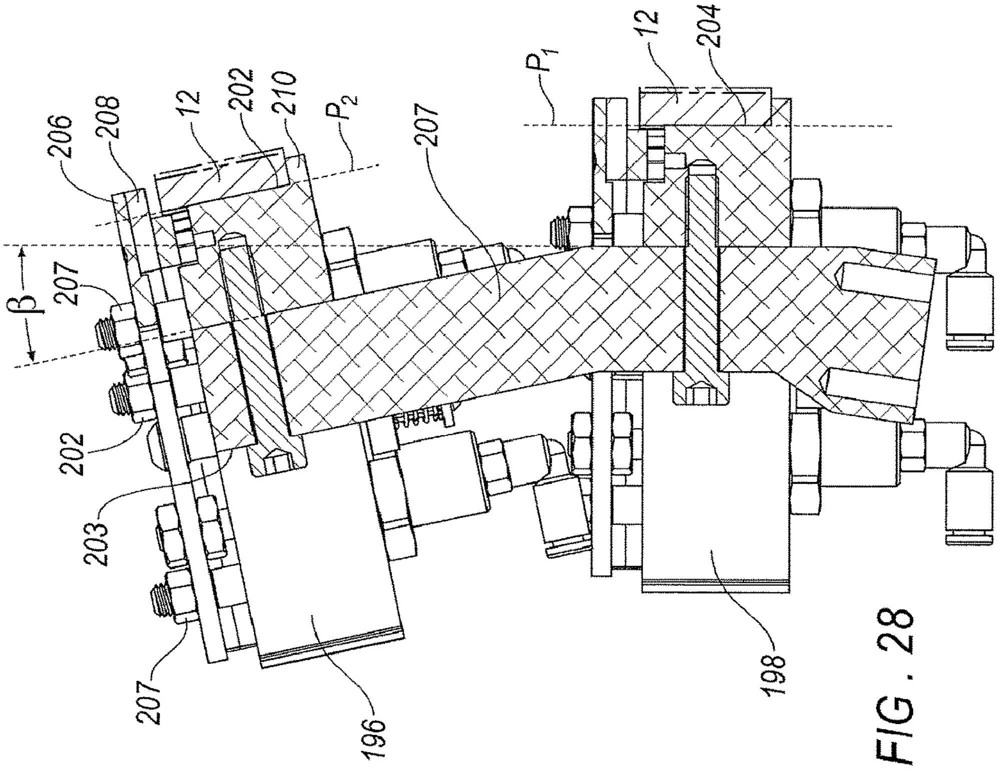
FIG. 28 is a partial cross-sectional view of the robotic "end of arm tool" of FIG. 26, taken along lines 28-28 of FIG. 27.

Once sections of the strip 12 of weight material has been cut and the backing 18 has been removed, they may be delivered to a weight apply apparatus/member, such as a robotic "end of arm tool" (EOAT) 26. One exemplary arrangement of an EOAT 26 is depicted in FIGS. 26-29. EOAT 26 comprises first and second arc members 196, 198 connected to a center rail 201. The first arc member 196 has an end face 202. The second arc member 198 has an end face 204. The end face 204 of the second arc member 198 is disposed along a first plane $P_1$. The end face 202 of the first arc member 196 is disposed along a second plane $P_2$. The second plane $P_2$ is angularly inclined an angle β from the first plane $P_1$. Moreover, the end face 202 of the first arc member 196 is positioned radially inboard of the second arc member 198, as shown in FIG. 28. In one exemplary arrangement, the end face 202 is positioned between 0.0625 and 9.30 inches inboard of end face 204. Angle β is preferably between 8 and 20 degrees. In one exemplary arrangement, the center rail 201 is angled about 12° and an end 203 of center rail 201 is positioned radially inboard about 0.125 inches to offset the first and second arc members 196, 198 to enable weights to be loaded and have independent engagement of the weights with the wheel rim surface.

In one exemplary arrangement, the end faces 202 and 204 are provided with a retaining system that selectively holds the strip 12 until applied to a wheel or other imbalanced member. The strips 12 are retained on the end faces 202, 204 with the adhesive material exposed. For example, in the EOAT 126 show in FIGS. 26-29 both the first and second arc members 196, 198 further includes a retaining plate 206 and an engagement pad 208. The engagement pad 208 is secured to a portion of the retaining plate 206 such that movement of the retaining plate 206 also moves the engagement pad 208. The engagement pad 208 may be made of compressible material, such as rubber. The retaining plate 206 is secured to the first arc member 196 by fasteners 207.

Adjacent to the end faces 202, 204 of the first and second arc members 196, 198, respectively, is a securing lip 210. Securing lip 210 is integral with the first arc member 196, but extends outwardly from the end face 202.

Figure 29:
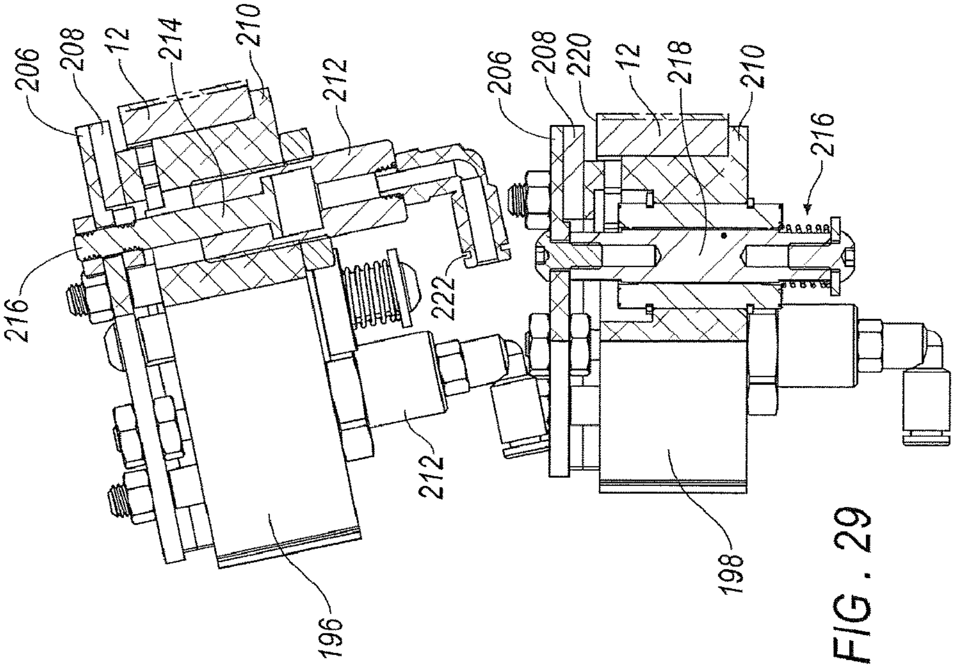
FIG. 29 is a partial cross-sectional view of the robotic "end of arm tool" of FIG. 26, taken along lines 29-29 of FIG. 27.

First arc member 196 also includes one or more pneumatic actuators 212. Actuators 212 include a piston 214 having an end 216 that is connected to the retaining plate 206, as best seen in FIG. 29. One or more biasing elements 216 are also provided. Biasing elements 216 are secured to a moveable post 218 that is fixedly connected to the retaining plate 206. The biasing element 216 serves to bias the retaining plate 206 upwardly such that the engagement pad 208 is spaced away from a peripheral edge 220 of the weight segments disposed on the end faces 202/204 of the first and second arc members 196, 198. In one exemplary arrangement, the gap between the bottom surface of the engagement pad 208 and the peripheral edge 220 is approximately 0.08 inches.

In operation, the cut weight segments are positioned on the end faces 202/204 of the first and second arc members 196/198. The actuators 212 (which are connected to the appropriate supply lines (not shown) at the connection ends 222) then overcome the biasing force of the biasing element 216 and pull the retaining plate 206 downwardly such that the engagement pad 208 comes into frictional engagement with the peripheral edge 220 of the weight segment 12. Due to the securing lip 210, the weight segment 12 becomes frictionally retained to the EOAT 26 as the weight segments 12 are delivered by the robot to the imbalanced element once the weight segments are positioned for application, the actuators are turned off and the biasing element 216 returns the retaining plate 206 to the open position so as to release the weight segments from the EOAT 26.

An alternative arrangement of an EOAT 26' is illustrated in FIGS. 32-36. In this arrangement, the first and second arc members 196' and 198' are configured to be electromagnetic so as to selectively retain the strip 12 of weight material on the EOAT 26' via a magnetic attraction. In this exemplary arrangement, the first arc member 196' is angled β about 18° with respect to the second arc member 198'. Further, an end face 202' of the first arc member 196' is radially offset from the end face 204' of the second arc member 198' by about 0.25 inches.

Figure 33:
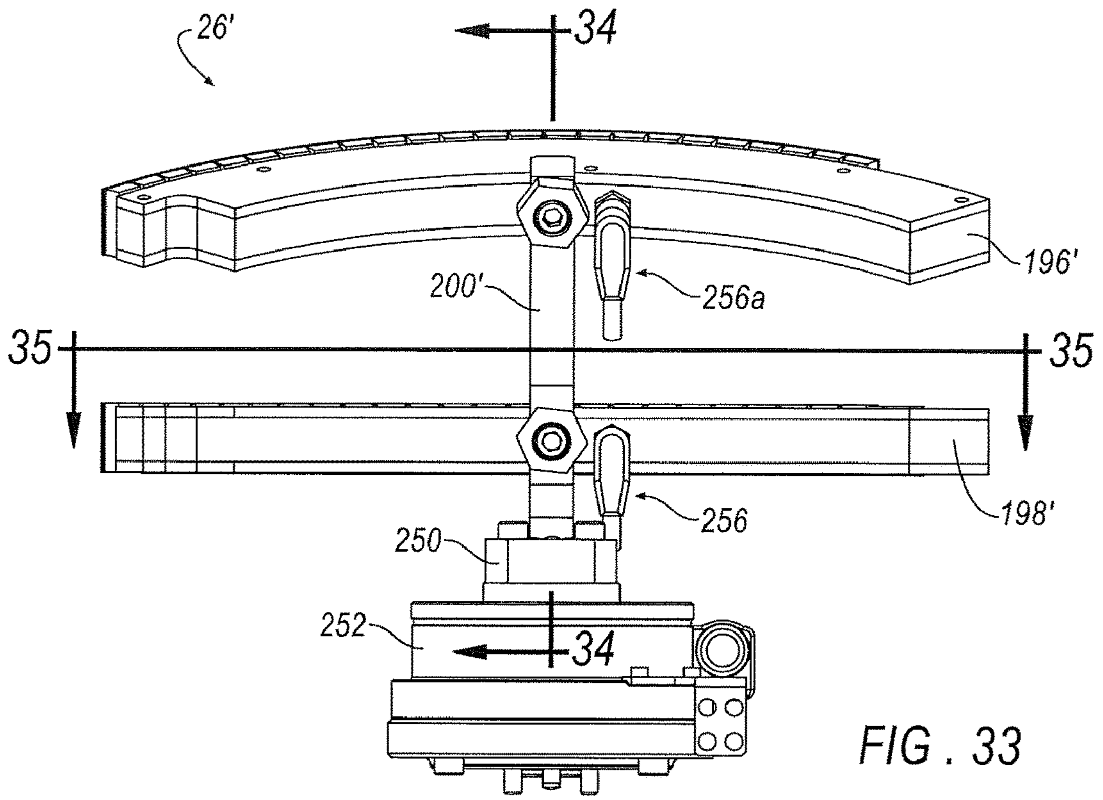
FIG. 33 is a rear elevational view of the robotic "end of arm tool" that may be used to apply weight segments to a wheel.

As best seen in FIG. 33, a center rail 200' that supports the first and second arc members 196' and 198', is attached to connecting plate 250. The connecting plate 250 mounts to a force sensor unit 252 that is operatively connected to the robot. In operation, when the EOAT 126' is engaged against the surface to which the weight segments are to be applied, the force sensor unit 252 serves to insure that the a steady force is maintained against the surface, thereby serving to make sure that the weight segments are fully engaged with the imbalanced member.

Figure 34:
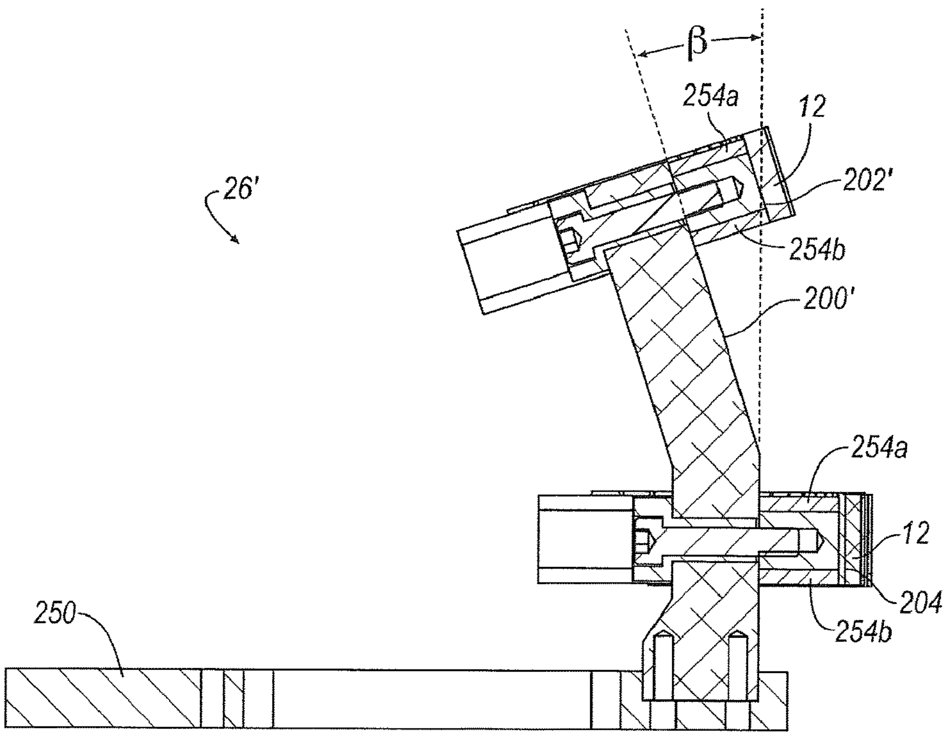
FIG. 34 is a cross-sectional view of the robotic "end of arm tool" taken along lines 34-34 of FIG. 33.
Figure 35:
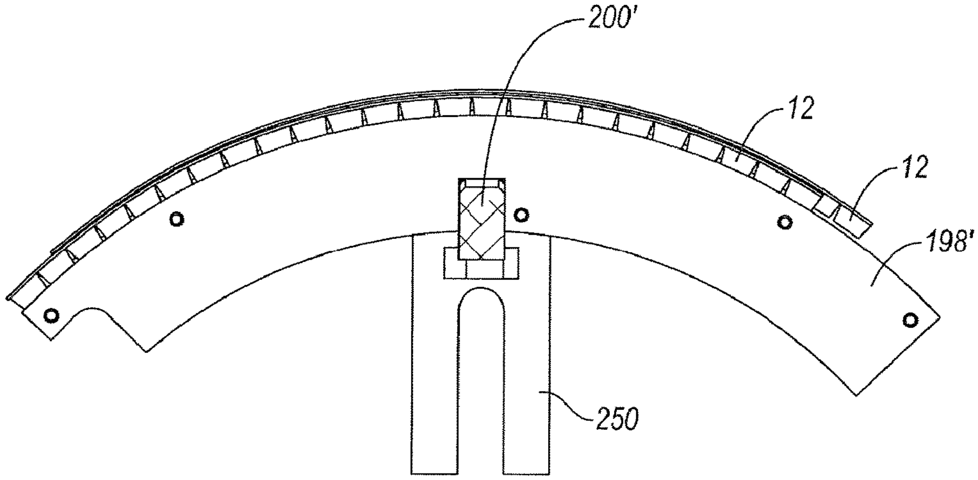
FIG. 35 is a partial cross-sectional view of the robotic "end of arm tool" taken along lines 35-35 of FIG. 33.
Figure 36:
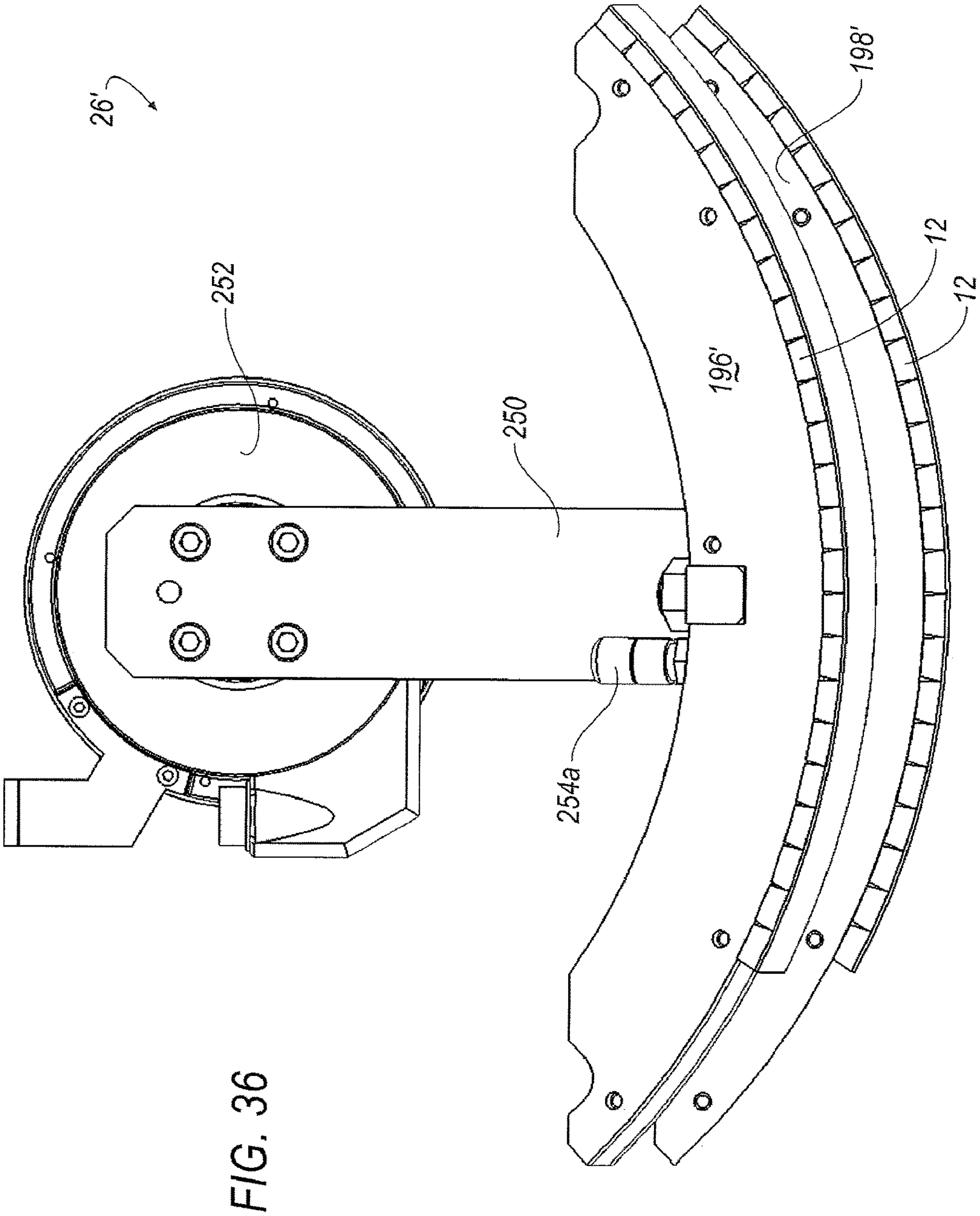
FIG. 36 is a top plan view of the robotic "end of arm tool" of FIG. 32.

As best seen in FIG. 34, first and second arc members 196' and 198' further comprises electromagnet strips **254*a* and 254*b*. In one exemplary arrangement, electromagnet strips 254*a*, 254*b* are disposed adjacent the top and bottom of the end faces 202' and 204'. However, it is understood that other placement configurations are contemplated. Nor is the present disclosure limited to using longitudinal strips of electromagnetic elements. For example, electromagnetic elements may be disposed in random patterns on the end faces 202' and 204'**.

The electromagnetic elements **254*a*, 254*b* may be selectively energized by traditional power delivery sources. In one exemplary arrangement, electrical connectors 256*a* and 256*b* are provided on the first and second arc members 196' and 198'. The electrical connectors 256*a* and 256*b* may be connected to a suitable power source. In operation, power is supplied to the electrical connectors 256*a* and 256*b*, the cut weight segments 12 will be magnetically retained on the end faces 202' and 204' of the first and second arc members 196' and 198'. However, when it is desired to release the weight segments 12 for placement, the electromagnetic elements are turned off. In one exemplary arrangement, the electromagnet elements may be electrically connected to the controller so as to allow a variable degree of magnetic strength. More specifically, for certain weight material, it may be desired to produce a greater magnetic force at end faces 202' and 204'** than for other weight material.

Another exemplary configuration of an EOAT 126" is illustrated in FIGS. 37-40. In this arrangement, the EOAT 126" has many of the same components as EOAT 126 and 126'. For example, EOAT 126" includes first and second arm members 196" and 198" that are supported by a center rail 200". However, the end faces of each of the first and second arm members 196" and 198" are include a magnetic material. Unlike the EOAT 126' that is constructed of an electromagnetic material that is selectively turned on and off, the magnetic force exhibited by EOAT 126" is always on.

To load the weight segments, a fixed track arrangement 280 is provided. The fixed track arrangement 280 comprises parallel plates 282 that may be joined together by a cross member 284. The plates 282 are spaced apart so as to create an open channel 286 that is accessible from the bottom. The plates 282 may have an arcuate shape that corresponds to the shape of the first and second arms 196" and 198". Lining the inside of the plates 282 are bumper elements 288.

The plates 282 are secured to part of the feed and cutting unit 18. More specifically, as may be seen in FIG. 38, an opening 290 is formed through the wall 84 that forms part of the housing 70 of the feed and cutting unit 18. A portion of the plates 282 is secured to support brackets 292. Support brackets 292 are connected to the base of the housing 70 and positioned adjacent to the cutter base assembly 80. With this arrangement, as the weight segments 12 are cut, they are delivered to the plates 282. More specifically, the weight segments 12 are pushed onto the bumper elements 288.

When the appropriate number of the weight segments 12 are pushed onto the bumper elements 288 between the plates 282, the robot is actuated such that one of the first and second arc members 196" or 198" are delivered up through the open channel 286 to contact the weight segments 12. The magnetic attraction of the magnetic elements disposed in the first and second arc members 196" and 198" will adhere the weight elements 12 to the first or second arc member 196" and 198". The robot will push the first or second arc member 196" or 198" up over the bumper elements 288 and the first or second arc member 196" or 198" is withdrawn from the plates 282 and delivered to an imbalanced member.

While the EOAT 126' and 126" are presented as alternatives to one another, it is understood that the mechanical/pneumatic clamping arrangement of EOAT 126 may be used in combination with either EOAT 126' and 126" as well.

When a new spool is introduced into the feed and cutting unit 18, the new spool will be spliced to the exhausted spool, as described in connection with FIG. 3B. However, the splicing tape (that adheres the end segments $E_1$ and $E_2$ of adjacent springs 12*a* and 12*b*) is typically provided with a different color tape to identify a splice area. Because it is not desirable to use weight segments from two different spools, referring to FIG. 37, a contrast sensor 300 may be secured to a support bracket 302. The contrast sensor 300 is electrically connected to a controller. The contrast sensor 300 is disposed downstream of the feed mechanism, but upstream of the tape backing tape removal assembly and upstream of the cutting blade. When the contrast sensor 300 detects a change in color between the backing tape 18, the controller sends a signal to the cutting blade 92 to initiate a cutting operation so as to cut a section of the strip 12 of weight material in the new spool. In addition, the controller can also be programmed to send a signal to identify if the weights in the splice tape area are to be "discarded" or "applied". Such a signal can be visible (such as an indicator light mounted on support bracket 302 or elsewhere), audible, or both.

Regardless of which EOAT is utilized, in operation, the controller operates to actuate the robot 24 to move the EOAT to place the first arc member 196/196'/196" into contact with an inner surface of wheel 20 such that one of the end faces 202, 204 are carrying the strip 12 comes into contact with the wheel 20 and is oriented to match the contour of the wheel 20. Due to the inclined and offset nature of the end faces 202, 204, only one end face will be able to contact the wheel 20 during an application cycle (thereby preventing accidental placement of weights on the other end face). The robot then actuates the EOAT to apply the weight in a rocking motion along the contour. In one exemplary arrangement, the EOAT will include a 6 axis load sensor to enable not only proper placement of the strip 12, but ensure full application. More specifically, the sensors provide a force feedback in the rocking motion to ensure full wet-out of the strip 12 of weight material; in essence providing a closed loop feedback system. The weight can be applied in a single rolling motion or in a back-and-forth rocking motion.

Once the first strip 12 is placed on the wheel 20, the robot 24 is actuated to tilt the EOAT to apply the second strip 12 of weight material that is disposed on the other of the first and second arc members 196/196'/196", 198/198'/198".

Figure 30:
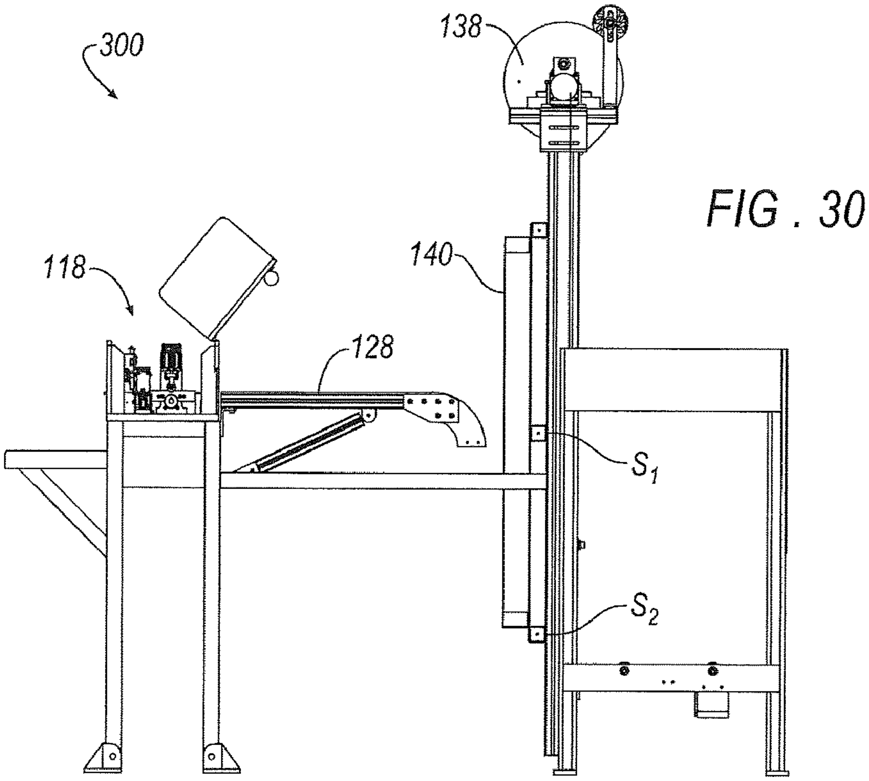
FIG. 30 illustrates an elevational view of an alternative exemplary arrangement for a system for cutting and applying a selected amount of weight material to a wheel.
Figure 31:
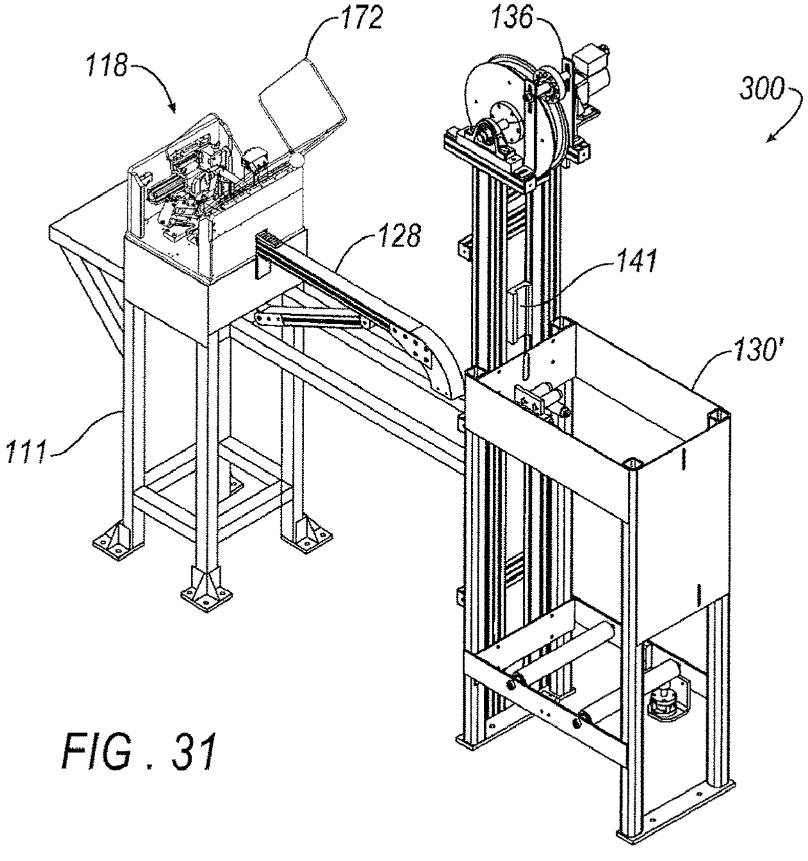
FIG. 31 is a perspective view of the system of FIG. 30.
Figure 32:
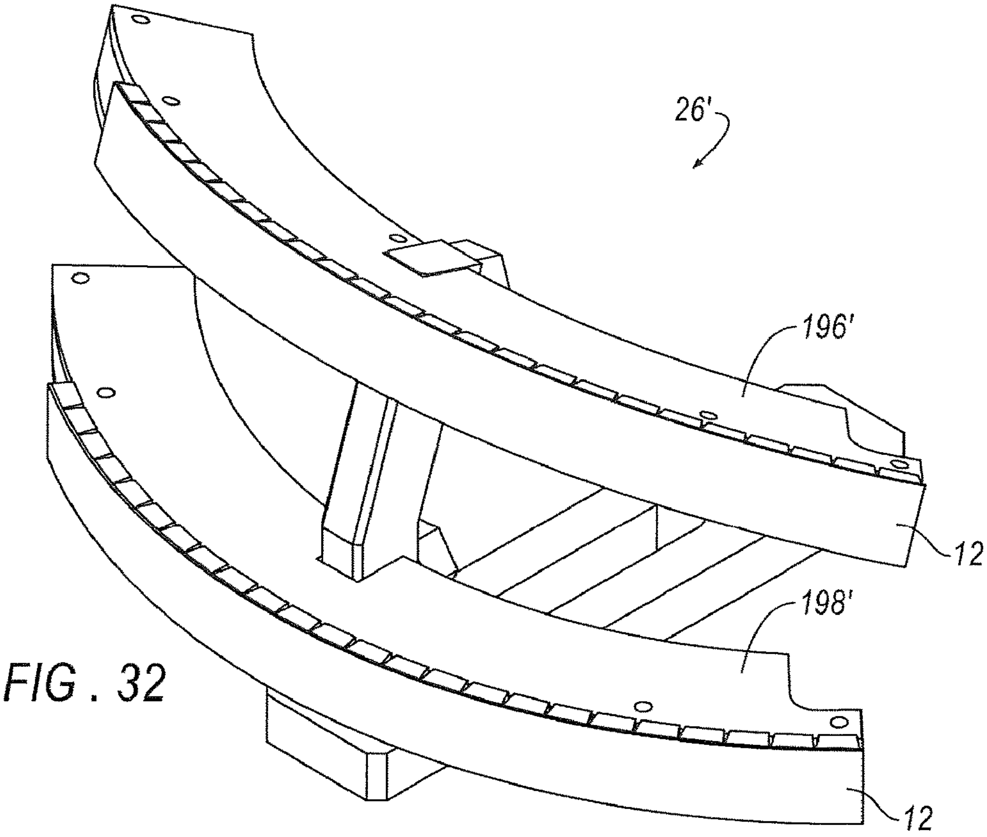
FIG. 32 is a perspective view of an alternative exemplary arrangement of a robotic "end of arm tool" that may be used to apply weight segments to a wheel.

An alternative arrangement of a system 300 for cutting and dispensing selectively chosen lengths of strips of weight material are shown in FIGS. 30-31. This arrangement illustrates the decoiler unit 116 positioned adjacent to a feed and cutting unit 118. Unlike the system 10 shown in FIG. 1, feed and cutting unit 118 is positioned on a stand 111. All other components of system 200 are generally identical to the components of system 10. The cut strips 12 will be collected on the side surface of the stand 111 and may be manually applied to a weight apply tool such as EOAT 126/126'/126".

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A feed and cutting unit for selectively cutting and dispensing individual weight material segments from a common strip of weight material, comprising:

a feed assembly that includes a drive roller operatively connected to a motor and a follower roller that cooperates with the drive roller to frictionally engage first and second surfaces of a strip of weight material to selectively move the strip of weight material to a cutter member;

wherein the strip of weight material comprises individual segments of weight material disposed on a common backing material by adhesive and separated by a gap;

at least one sensor operatively connected to a controller, wherein the at least one sensor measures a predetermined amount of segmented weight material on the strip of weight material as the feed assembly moves the strip of weight material past the sensor; and wherein the cutter member is operatively connected to the controller, wherein the controller actuates the cutter member to separate the predetermined amount of segmented weight material from the strip of weight material by cutting at least a portion of the backing material in the gap disposed between adjacent segments of weight material during the cutting operation; and a weight apply member including first and second arc members directly connected to a center rail extending between the first and second arc members, wherein the first and second arc members include electro/magnetic members in end faces of the first and second arc members, and when power is supplied to the electro/magnetic members, the segments of weight material are retained to the weight apply member.

2. The unit of claim 1, wherein the first arc member has end face disposed in a first plane, and wherein the second arc member has an end face disposed in a second plane that is offset from the first plane.

3. The unit of claim 2, wherein the first and second arc members have at least one magnetic element disposed within the first and second end faces.

4. The unit of claim 2, further comprising a force sensor connected to the weight apply member, wherein the force sensor is used to verify that a constant press force is maintained by the weight apply member during a weight apply operation.

5. A feed and cutting unit for selectively cutting and dispensing individual weight material segments from a common strip of weight material, comprising:

a feed assembly that includes a drive roller operatively connected to a motor and a follower roller that cooperates with the drive roller to frictionally engage first and second surfaces of a strip of weight material to selectively move the strip of weight material to a cutter member;

wherein the strip of weight material comprises individual segments of weight material disposed on a common backing material by adhesive and separated by a gap;

wherein the cutter member is operatively connected to the controller, wherein the controller actuates the cutter member to separate a predetermined amount of segmented weight material from the strip of weight material by cutting at least a portion of the backing material in a gap between adjacent segments of weight material during the cutting operation; and a weight apply member including first and second arc members directly connected to a center rail extending between the first and second arc members, wherein the first and second arc members have at least one magnetic element disposed within an end face of each of the first and second arc members.

6. The unit of claim 5, further comprising at least one sensor operatively connected to a controller, wherein the at least one sensor measures the predetermined amount of segmented weight material on the strip of weight material as the feed assembly moves the strip of weight material past the sensor.

7. The unit of claim 5, wherein the first arc member has a first end face disposed in a first plane, and wherein the second arc member has a second end face disposed in a second plane that is offset from the first plane.

8. The unit of claim 5, wherein the first and second arc members include electro/magnetic members in end faces of the first and second arc members, and when power is supplied to the electro/magnetic members, the segments of weight material are retained to the weight apply member.

9. The unit of claim 5, further comprising a force sensor connected to the weight apply member, wherein the force sensor is used to verify that a constant press force is maintained by the weight apply member during a weight apply operation.

10. A feed and cutting unit for selectively cutting and dispensing individual weight material segments from a common strip of weight material, comprising:

a feed assembly that includes a drive roller operatively connected to a motor and a follower roller that cooperates with the drive roller to frictionally engage first and second surfaces of a strip of weight material to selectively move the strip of weight material to a cutter member;

wherein the strip of weight material comprises individual segments of weight material disposed on a common backing material by adhesive and separated by a gap;

wherein the cutter member is operatively connected to the controller, wherein the controller actuates the cutter member to separate a predetermined amount of segmented weight material from the strip of weight material by cutting at least a portion of the backing material in a gap between adjacent segments of weight material during the cutting operation; and a weight apply member including first and second arc members directly connected to a center rail extending between the first and second arc members, wherein the first and second arc members include electro/magnetic members in end faces of the first and second arc members, and when power is supplied to the electro/magnetic members, the segments of weight material are retained to the weight apply member; and a force sensor connected to the weight apply member, wherein the force sensor is used to verify that a constant press force is maintained by the weight apply member during a weight apply operation.

11. The unit of claim 10, further comprising at least one sensor operatively connected to a controller, wherein the at least one sensor measures the predetermined amount of segmented weight material on the strip of weight material as the feed assembly moves the strip of weight material past the sensor.

12. The unit of claim 10, wherein the first arc member has a first end face disposed in a first plane, and wherein the second arc member has a second end face disposed in a second plane that is offset from the first plane.

13. The unit of claim 10, wherein the first and second arc members have at least one magnetic element disposed within the first and second end faces.

* * * * *